(12) United States Patent
Wu et al.

(10) Patent No.: US 12,301,480 B2
(45) Date of Patent: May 13, 2025

(54) BUFFER CONFIGURATION METHOD AND SWITCHING DEVICE

(71) Applicant: HUAWEI TECHNOLOGIES CO., LTD., Guangdong (CN)

(72) Inventors: Tao Wu, Nanjing (CN); Jian Yan, Nanjing (CN); Yongxian Chen, Nanjing (CN); Heyang Liu, Nanjing (CN); Huafeng Wen, Nanjing (CN); Liyang Sun, Leuven (BE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 167 days.

(21) Appl. No.: 18/150,877

(22) Filed: Jan. 6, 2023

(65) Prior Publication Data

US 2023/0164094 A1   May 25, 2023

Related U.S. Application Data

(63) Continuation of application No. PCT/CN2021/102867, filed on Jun. 28, 2021.

(30) Foreign Application Priority Data

Jul. 7, 2020 (CN) .......................... 202010646219.4

(51) Int. Cl.
*G06F 15/173* (2006.01)
*H04L 47/24* (2022.01)
*H04L 49/9005* (2022.01)

(52) U.S. Cl.
CPC ......... *H04L 49/9005* (2013.01); *H04L 47/24* (2013.01)

(58) Field of Classification Search
CPC ............................ H04L 49/9005; H04L 47/24
(Continued)

(56) References Cited

U.S. PATENT DOCUMENTS

| | | | |
|---|---|---|---|
| 7,593,329 B2 * | 9/2009 | Kwan | H04L 47/50 370/428 |
| 7,948,880 B2 * | 5/2011 | Kwan | H04L 47/30 370/232 |

(Continued)

OTHER PUBLICATIONS

IEEE Std 802.1Qbb-2011, Media Access Control (MAC) Bridges and Virtual Bridged Local Area Networks—Amendment 17: Priority-based Flow Control, IEEE Computer Society, Sep. 30, 2011, total 40 pages.

(Continued)

*Primary Examiner* — Alicia Baturay

(57) ABSTRACT

A buffer configuration method and a switching device are disclosed, to ensure no packet loss, and belongs to the field of network technologies. The method includes: sending, by a first switching device, a first measurement frame to a second switching device; receiving, by the first switching device, a second measurement frame sent by the second switching device, where the second measurement frame is generated based on the first measurement frame; determining, by the first switching device, a buffer configuration parameter based on the first measurement frame and the second measurement frame; and setting, by the first switching device, a local buffer based on the configuration parameter. The present disclosure is used to automatically configure a buffer of a switching device, thereby reducing required buffer space without packet loss.

19 Claims, 16 Drawing Sheets

(58) Field of Classification Search
USPC .......................................................... 709/238
See application file for complete search history.

(56) References Cited

U.S. PATENT DOCUMENTS

| | | | | | |
|---|---|---|---|---|---|
| 7,953,002 | B2* | 5/2011 | Opsasnick | ............... | H04L 47/32 709/225 |
| 8,218,546 | B2* | 7/2012 | Opsasnick | ............ | H04L 47/623 370/413 |
| 8,750,114 | B2* | 6/2014 | Lott | ......... | H04L 47/29 370/235 |
| 9,122,439 | B2* | 9/2015 | Matthews | .................. | G06F 9/50 |
| 9,166,919 | B2* | 10/2015 | Tabatabaee | .............. | H04L 47/30 |
| 9,282,022 | B2* | 3/2016 | Matthews | ........... | H04L 41/0661 |
| 9,400,606 | B2* | 7/2016 | Matthews | ................ | G06F 12/06 |
| 9,467,522 | B2* | 10/2016 | Matthews | ................ | H04L 47/11 |
| 9,699,095 | B2* | 7/2017 | Elias | ......... | H04L 47/20 |
| 9,729,459 | B2* | 8/2017 | Hendel | ................ | H04L 47/30 |
| 9,774,536 | B2* | 9/2017 | Louzoun | ................ | H04L 47/29 |
| 9,948,578 | B2* | 4/2018 | Subasingha | ............ | H04L 65/756 |
| 10,038,652 | B2* | 7/2018 | Ghanwani | ........... | H04L 49/9005 |
| 10,069,701 | B2* | 9/2018 | Elias | ................ | H04L 49/254 |
| 10,686,861 | B2* | 6/2020 | Erkin | ..................... | H04L 65/762 |
| 10,708,189 | B1* | 7/2020 | Agrawal | ............. | H04L 49/3009 |
| 10,735,331 | B1* | 8/2020 | Li | ........................ | H04L 47/2458 |
| 10,873,878 | B2* | 12/2020 | Chu | ....................... | H04L 1/1671 |
| 11,070,097 | B2* | 7/2021 | Park | ..................... | H04B 5/79 |
| 11,252,619 | B2* | 2/2022 | Park | .................... | H04W 36/302 |
| 11,258,719 | B1* | 2/2022 | Sommers | ............ | H04L 47/2466 |
| 11,418,983 | B2* | 8/2022 | Koudouridis | .......... | H04W 72/20 |
| 11,470,010 | B2* | 10/2022 | Mula | ........................ | H04L 47/30 |
| 11,496,004 | B2* | 11/2022 | Park | ......................... | H04B 5/79 |
| 11,503,499 | B2* | 11/2022 | Chu | .................... | H04L 27/2601 |
| 11,546,813 | B2* | 1/2023 | Park | ..................... | H04W 36/302 |
| 11,696,196 | B2* | 7/2023 | Park | ....................... | H04W 36/08 370/331 |
| 12,010,028 | B1* | 6/2024 | Abdelnasser | ....... | H04L 47/2416 |
| 2021/0056416 | A1* | 2/2021 | Kato | ......................... | G06N 3/08 |
| 2023/0254259 | A1* | 8/2023 | Aravinthan | ............. | H04L 47/24 370/230 |
| 2024/0205172 | A1* | 6/2024 | Ghanwani | ................ | H04L 49/90 |
| 2024/0250912 | A1* | 7/2024 | Ghanwani | ........... | H04L 43/0894 |

OTHER PUBLICATIONS

IEEE Std 802.3ba-2010, IEEE Standard for Information technology—Local and metropolitan area networks—Specific requirements—Part 3: CSMA/CD Access Method and Physical Layer Specifications Amendment 4: Media Access Control Parameters, Physical Layers, and Management Parameters for 40 GB/s and 100 GB/s Operation, IEEE Computer Society, Jun. 22, 2010, total 457 pages.

IEEE Std 802.3as-2006, IEEE Standard for Information technology—Telecommunications and information exchange between systems—Local and metropolitan area networks—Specific requirements Part 3: Carrier Sense Multiple Access with Collision Detection (CSMA/CD) Access Method and Physical Layer Specifications, IEEE Computer Society, Nov. 13, 2006, total 103 pages.

* cited by examiner

BUFFER CONFIGURATION METHOD AND SWITCHING DEVICE

CROSS-REFERENCE TO RELATED APPLICATIONS

This application is a continuation of International No. Application PCT/CN2021/102867, filed on Jun. 28, 2021, which claims priority to Chinese Patent Application No. 202010646219.4, filed on Jul. 7, 2020. The disclosures of the aforementioned applications are hereby incorporated by reference in their entireties.

TECHNICAL FIELD

The present disclosure relates to the field of network technologies, and in particular, to a buffer configuration method and a switching device.

BACKGROUND

A data packet forwarding process on the Internet is implemented based on a large quantity of switches. Each switch has a forwarding function. An upstream switch forwards a received data packet to a downstream switch, and the downstream switch continues to forward the data packet until the data packet arrives at a destination address. To ensure that the switch normally forwards the data packet, traffic of the switch needs to be controlled to avoid excessive load of the switch.

In the Institute of electrical and electronics engineers (IEEE) 802.1 and 802.3 standards, a priority-based flow control (priority-based flow control, PFC) mechanism is provided. In the PFC mechanism, when learning that congestion occurs in a priority queue of a downstream switch, an upstream switch suspends dequeuing a data packet from a priority queue. However, the configuration of a headroom (HDRM) of the switch is involved in the PFC mechanism. In the conventional technology, a user usually configures a value of an HDRM of a local buffer of a switch based on a default value that is of the HDRM and that is in a guide of a device manufacturer or that is set when the device is delivered from a factory.

However, the default value that is of the HDRM and that is in the guide of the device manufacturer or that is set when the device is delivered from the factory cannot be suitable for all networking scenarios. When the value of the HDRM is set to be excessively large, buffer space is wasted. If the value of the HDRM is set to be excessively small, a packet loss occurs.

SUMMARY

The present disclosure provides a buffer configuration method and a switching device, to automatically configure a local buffer to ensure no packet loss.

According to a first aspect, an embodiment of the present disclosure provides a buffer configuration method. The method includes:

A first switching device sends a first measurement frame to a second switching device.

The first switching device receives a second measurement frame sent by the second switching device. The second measurement frame is generated through triggering based on the first measurement frame.

The first switching device determines a buffer configuration parameter based on the first measurement frame and the second measurement frame.

The first switching device sets a local buffer based on the configuration parameter.

In this possible design, the method may be applied to a networking architecture including the first switching device and the second switching device, and the first switching device and the second switching device are communicatively connected through a port. The first switching device and the second switching device may be network devices or terminal devices. A common network device includes a switch, and a common terminal device includes a network adapter. A first measurement frame generator is disposed inside the first switching device, and the first measurement frame generator may be any one of a processor, a field-programmable gate array (FPGA), and a PFC engine. The first switching device sends the first measurement frame to the second switching device. After receiving the first measurement frame, the second switching device triggers the second measurement frame to be generated. The first switching device determines the configuration parameter of the local buffer based on the first measurement frame and the second measurement frame, to implement an automatic configuration of the local buffer, thereby reducing use of the local buffer of the switching device, and improving a burst absorption capability and supporting more lossless queues while ensuring no packet loss.

In a possible design of the first aspect, that the first switching device determines a buffer configuration parameter based on the first measurement frame and the second measurement frame includes:

The first switching device obtains a first timestamp and a fourth timestamp. The first timestamp is a time at which the first switching device sends the first measurement frame, and the fourth timestamp is a time at which the first switching device receives the second measurement frame.

The first switching device determines the buffer configuration parameter based on the first timestamp and the fourth timestamp.

In this possible design, the time at which the first switching device sends the first measurement frame is recorded as the first timestamp, and the time at which the first switching device receives the second measurement frame is recorded as the fourth timestamp. The first timestamp and the fourth timestamp may be used to represent a data exchange speed between the first switching device and the second switching device. Therefore, the first switching device can determine the buffer configuration parameter based on the first timestamp and the fourth timestamp, so that the configuration parameter fits data transmission performance of the first switching device and the second switching device.

In a possible design of the first aspect, the first timestamp is a time at which the last bit of the first measurement frame enters a MAC layer of the first switching device, and the fourth timestamp is a time at which the last bit of the second measurement frame is sent from the MAC layer of the first switching device.

In a possible design of the first aspect, the first timestamp is a time at which the last bit of the first measurement frame is sent from a MAC layer of the first switching device, and the fourth timestamp is a time at which the last bit of the second measurement frame enters the MAC layer of the first switching device.

In a possible design of the first aspect, the first timestamp and the fourth timestamp are encapsulated in a time field following an Opcode field of the second measurement frame.

In this possible design, the first timestamp and the fourth timestamp may be encapsulated in the second measurement frame, so that a timestamp reading step can be omitted, and the first switching device can quickly obtain timestamp information. For example, a PFC frame format may be used as a format of the second measurement frame to store the first timestamp and the fourth timestamp in the time field following the Opcode field of the second measurement frame. Because a PFC frame is a MAC control frame, the MAC layer of the first switching device can directly identify the Opcode field, and then read the time field following the Opcode field to quickly obtain the timestamp information.

In a possible design of the first aspect, the first timestamp and the fourth timestamp are stored in the local buffer of the first switching device.

In this possible design, the first timestamp and the fourth timestamp are stored in the local buffer of the first switching device, and the first switching device obtains timestamp information from the local buffer.

In a possible design of the first aspect, the determining the buffer configuration parameter based on the first timestamp and the fourth timestamp includes:

The first switching device determines a timestamp difference based on the first timestamp and the fourth timestamp.

The first switching device determines the buffer configuration parameter based on the timestamp difference, timestamp precision, a port rate between the first switching device and the second switching device, a configured maximum frame length, and a constant K. The constant K is provided by a device manufacturer.

In this possible design, the first switching device first calculates the timestamp difference based on the first timestamp and the fourth timestamp, and then determines the buffer configuration parameter based on the timestamp difference, the timestamp precision, the port rate between the first switching device and the second switching device, and the configured maximum frame length. Therefore, the first switching device can obtain the buffer configuration parameter associated with the exchange speed and the port rate between the first switching device and the second switching device and the configured maximum frame length, to implement an accurate configuration of the local buffer, thereby reducing use of the local buffer of the switching device, and improving a burst absorption capability and supporting more lossless queues while ensuring no packet loss.

In a possible design of the first aspect, the method further includes: The first switching device obtains a second timestamp and a third timestamp. The second timestamp is a time at which the second switching device receives the first measurement frame, and the third timestamp is a time at which the second switching device sends the second measurement frame.

In this possible design, the time at which the second switching device receives the first measurement frame is recorded as the second timestamp, and the time at which the second switching device sends the second measurement frame is recorded as the third timestamp. The second timestamp and the third timestamp may be used to represent delay time from receiving, by the second switching device, the first measurement frame to triggering the second measurement frame to be generated. Therefore, the first switching device can determine the buffer configuration parameter based on the first timestamp, the second timestamp, the third timestamp, and the fourth timestamp, so that the configuration parameter fits data transmission performance of the first switching device and the second switching device.

In a possible design of the first aspect, the second timestamp is a time at which the last bit of the first measurement frame is sent from a MAC layer of the second switching device, and the third timestamp is a time at which the last bit of the second measurement frame enters the MAC layer of the second switching device.

In a possible design of the first aspect, the second timestamp is a time at which the last bit of the first measurement frame enters a MAC layer of the second switching device, and the third timestamp is a time at which the last bit of the second measurement frame is sent from the MAC layer of the second switching device.

In a possible design of the first aspect, the second timestamp and the third timestamp are encapsulated in the time field following the Opcode field of the second measurement frame.

In this possible design, the second timestamp and the third timestamp may be encapsulated in the second measurement frame, so that a timestamp reading step can be omitted, and the first switching device can quickly obtain timestamp information. For example, the PFC frame format may be used as the format of the second measurement frame to store the second timestamp and the third timestamp in the time field following the Opcode field of the second measurement frame. Because the PFC frame is a MAC control frame, the MAC layer of the first switching device can directly identify the Opcode field, and then read the time field following the Opcode field to quickly obtain the timestamp information.

In a possible design of the first aspect, the second timestamp and the third timestamp are stored in the local buffer of the first switching device.

In this possible design, the second timestamp and the third timestamp are stored in the local buffer of the first switching device, and the first switching device obtains timestamp information from the local buffer.

In a possible design of the first aspect, the method further includes:

The first switching device determines a timestamp difference based on the first timestamp, the second timestamp, the third timestamp, and the fourth timestamp.

The first switching device determines the buffer configuration parameter based on the timestamp difference, timestamp precision, a port rate between the first switching device and the second switching device, a configured maximum frame length, and a constant K. The constant K is provided by a device manufacturer.

In this possible design, the first switching device first calculates the timestamp difference based on the first timestamp, the second timestamp, the third timestamp, and the fourth timestamp, and then determines the buffer configuration parameter based on the timestamp difference, the timestamp precision, the port rate between the first switching device and the second switching device, and the configured maximum frame length. Therefore, the first switching device can obtain the buffer configuration parameter associated with the exchange speed and the port rate between the first switching device and the second switching device and the configured maximum frame length, to implement an accurate configuration of the local buffer, thereby reducing use of the local buffer of the switching device, and improving a burst absorption capability and supporting more lossless queues while ensuring no packet loss.

In a possible design of the first aspect, the method further includes:

The first switching device sends the buffer configuration parameter to the second switching device, so that the second switching device sets a local buffer based on the configuration parameter.

In this possible design, the second switching device may further set the local buffer of the second switching device by using the buffer configuration parameter calculated by the first switching device, so that the second switching device can also implement an automatic configuration of the buffer.

In a possible design of the first aspect, before the first switching device sends the first measurement frame to the second switching device, the method further includes:
  determining whether both the first switching device and the second switching device support an automatic buffer configuration function of priority-based flow control.

In this possible design, only when both the first switching device and the second switching device support the automatic buffer configuration function of priority-based flow control, the foregoing method can be applied to implement an automatic configuration of the local buffer. Therefore, before the method is applied, it is first determined whether both the first switching device and the second switching device support the automatic buffer configuration function of priority-based flow control.

In a possible design of the first aspect, the determining whether both the first switching device and the second switching device support an automatic buffer configuration function of priority-based flow control includes:
  when the first switching device supports the automatic buffer configuration function of priority-based flow control, and received TLV-format data fed back by the second switching device includes a buffer configuration field, determining that both the first switching device and the second switching device support the automatic buffer configuration function of priority-based flow control.

In this possible design, a link layer discovery protocol (LLDP) may be used between the first switching device and the second switching device to determine whether both the first switching device and the second switching device support the automatic buffer configuration function of priority-based flow control.

In a possible design of the first aspect, when the automatic buffer configuration function is not supported by either the first or second switching device, the method further includes:
  giving a prompt that the local buffer needs to be manually set.

In a possible design of the first aspect, the buffer configuration parameter is used to represent a required buffer size, and a unit of the buffer configuration parameter includes a bit or a minimum storage unit of a chip buffer.

In a possible design of the first aspect, the buffer configuration parameter includes buffer space required for priority-based flow control.

In a possible design of the first aspect, the second measurement frame is generated by the second switching device by performing loopback or acknowledgement processing on the first measurement frame.

According to a second aspect, the present disclosure provides a buffer configuration method. The method includes:
  A second switching device receives a first measurement frame sent by a first switching device, and triggers, based on the first measurement frame, a second measurement frame to be generated.

The second switching device sends the second measurement frame to the first switching device.

The second switching device receives a buffer configuration parameter sent by the first switching device.

The second switching device sets a local buffer based on the configuration parameter.

In this possible design, the method may be applied to a networking architecture including the first switching device and the second switching device, and the first switching device and the second switching device are communicatively connected through a port. The first switching device and the second switching device may be network devices or terminal devices. A common network device includes a switch, and a common terminal device includes a network adapter. A second measurement frame generator is disposed inside the second switching device, and the second measurement frame generator may be any one of a processor, an FPGA, and a PFC engine. After receiving the first measurement frame sent by the first switching device, the second switching device triggers the second measurement frame to be generated, and sends the second measurement frame to the first switching device, so that the first switching device determines the configuration parameter of the local buffer based on the first measurement frame and the second measurement frame. Finally, the second switching device configures the local buffer based on the buffer configuration parameter determined by the first switching device, to implement an automatic configuration of the local buffer, thereby reducing use of the local buffer of the switching device, and improving an absorption burst capability and supporting more lossless queues while ensuring no packet loss.

In a possible design of the second aspect, before the second switching device receives the first measurement frame sent by the first switching device, the method further includes:
  determining whether both the first switching device and the second switching device support an automatic buffer configuration function of priority-based flow control.

In this possible design, only when both the first switching device and the second switching device support the automatic buffer configuration function of priority-based flow control, the foregoing method can be applied to implement an automatic configuration of the local buffer. Therefore, before the method is applied, it is first determined whether both the first switching device and the second switching device support the automatic buffer configuration function of priority-based flow control.

In a possible design of the second aspect, the determining whether both the first switching device and the second switching device support an automatic buffer configuration function of priority-based flow control includes:
  when the second switching device supports the automatic buffer configuration function of priority-based flow control, and received TLV-format data fed back by the first switching device includes a buffer configuration field, determining that both the first switching device and the second switching device support the automatic buffer configuration function of priority-based flow control.

In this possible design, a link layer discovery protocol (LLDP) may be used between the first switching device and the second switching device to determine whether both the first switching device and the second switching device support the automatic buffer configuration function of priority-based flow control.

In a possible design of the second aspect, the automatic buffer configuration function is not supported by either the first or second switching device, the method further includes:

giving a prompt that the local buffer needs to be manually set.

In a possible design of the second aspect, the buffer configuration parameter is used to represent a required buffer size, and a unit of the buffer configuration parameter includes a bit or a minimum storage unit of a chip buffer.

In a possible design of the second aspect, the buffer configuration parameter includes buffer space required for priority-based flow control.

In a possible design of the second aspect, the triggering, based on the first measurement frame, a second measurement frame to be generated includes:

The second switching device performs loopback or acknowledgement processing on the first measurement frame to generate the second measurement frame.

According to a third aspect, the present disclosure provides a first switching device, including a processor and a transceiver. The processor is configured to execute instructions in computer executable program code. When the processor executes the instructions, the instructions cause the first switching device to perform the method in any design of the first aspect.

According to a fourth aspect, the present disclosure provides a second switching device, including a processor and a transceiver. The processor is configured to execute instructions in computer executable program code. When the processor executes the instructions, the instructions cause the first switching device to perform the method in any design of the second aspect.

According to a fifth aspect, the present disclosure provides a networking system, including a first switching device and a second switching device. The first switching device and the second switching device are communicatively connected through a port. The first switching device performs the method in any design of the first aspect, and the second switching device performs the method in any design of the second aspect.

According to a sixth aspect, the present disclosure provides a chip, including a memory and a processor. The memory is configured to store program instructions, and the processor is configured to invoke the program instructions in the memory to perform the method of the first aspect in embodiments of the present disclosure.

According to a seventh aspect, the present disclosure provides a chip, including a memory and a processor. The memory is configured to store program instructions, and the processor is configured to invoke the program instructions in the memory to perform the method of the second aspect in embodiments of the present disclosure.

According to an eighth aspect, the present disclosure provides a readable storage medium. The readable storage medium stores a computer program, and when the computer program is executed, the method of the first aspect in embodiments of the present disclosure is implemented.

According to a ninth aspect, the present disclosure provides a readable storage medium. The readable storage medium stores a computer program, and when the computer program is executed, the method of the second aspect in embodiments of the present disclosure is implemented.

According to a tenth aspect, the present disclosure provides a program product. The program product includes a computer program, and the computer program is stored in a readable storage medium. At least one processor of a communication apparatus may read the computer program from the readable storage medium, and the at least one processor executes the computer program, so that the communication apparatus implements the method in any design of the first aspect in embodiments of the present disclosure.

According to an eleventh aspect, the present disclosure provides a program product. The program product includes a computer program, and the computer program is stored in a readable storage medium. At least one processor of a communication apparatus may read the computer program from the readable storage medium, and the at least one processor executes the computer program, so that the communication apparatus implements the method in any design of the second aspect in embodiments of the present disclosure.

In the present disclosure, the first switching device sends a measurement frame to the second switching device, and receives a measurement frame fed back by the second switching device, to determine a configuration parameter of a local buffer, so that the first switching device and the second switching device can implement an automatic configuration of the buffer. In this way, use of buffer space is reduced while no packet loss is ensured, so that the switching device can increase buffer space used by a user to absorb a burst, thereby supporting more lossless queues.

DESCRIPTION OF EMBODIMENTS

Figure 1:
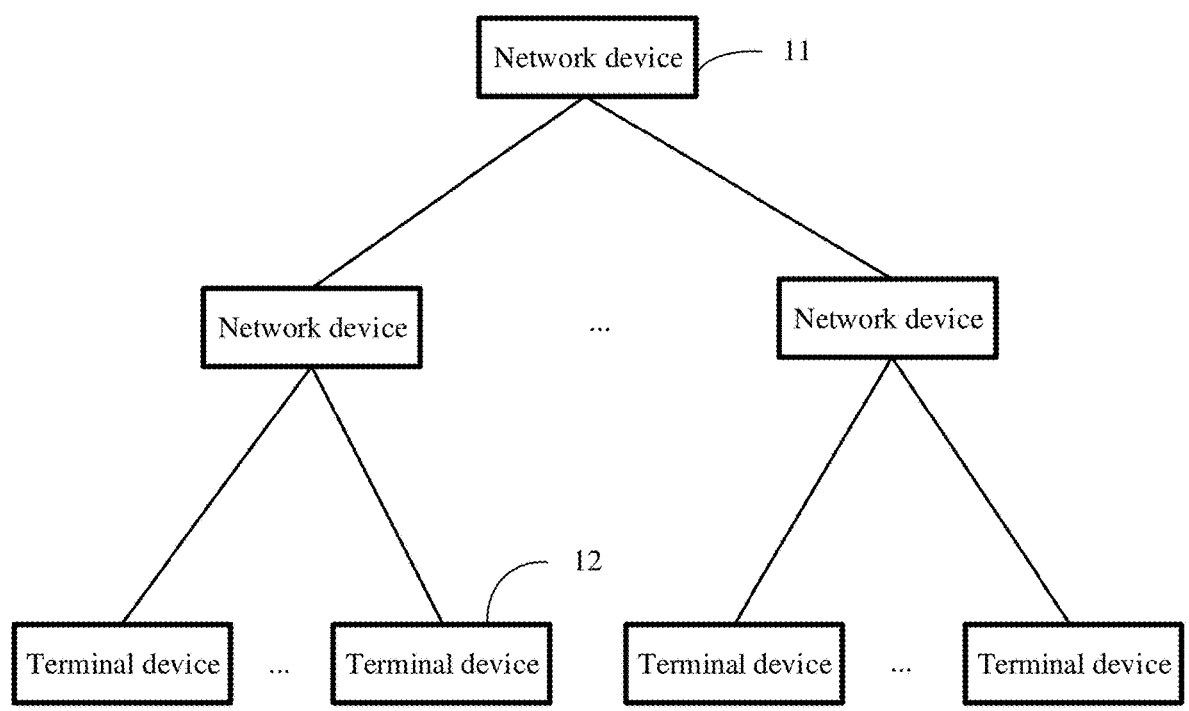
FIG. 1 is a schematic diagram of a networking structure of a data center according to an embodiment of the present disclosure.

FIG. 1 is a schematic diagram of a networking structure of a data center according to an embodiment of the present disclosure. As shown in FIG. 1, the data center includes a plurality of network devices 11 and terminal devices 12. At least two levels of data transmission links are formed between the network devices 11, and an upstream network device 11 sends data to a downstream network device 11 until the downstream network device 11 sends the data to the terminal device 12. To avoid a packet loss in a data transmission process, a priority-based flow control (PFC) mechanism is used for the network devices 11 and the terminal devices 12 in entire networking. Optionally, three parameters, Xoff (pause), Xon (resume), and an HDRM (headroom), corresponding to a port priority are configured on each network device 11 and terminal device 12. Xoff and Xon may be configured by a user based on a user requirement. A value of the HDRM is usually a default value that is of the HDRM and that is in a guide of a device manufacturer or that is set when the device is delivered from a factory. However, the default value that is of the HDRM and that is in the guide of the device manufacturer or that is set when the device is delivered from the factory is a fixed value, and cannot be suitable for all networking scenarios. When the value of the HDRM is set to be excessively large, buffer space is wasted. If the value of the HDRM is set to be excessively small, a packet loss occurs.

To resolve the problems in the conventional technology, embodiments of the present disclosure provide a buffer configuration method, so that a network device and a terminal device can automatically configure local buffers, thereby ensuring no packet loss.

Figure 2:
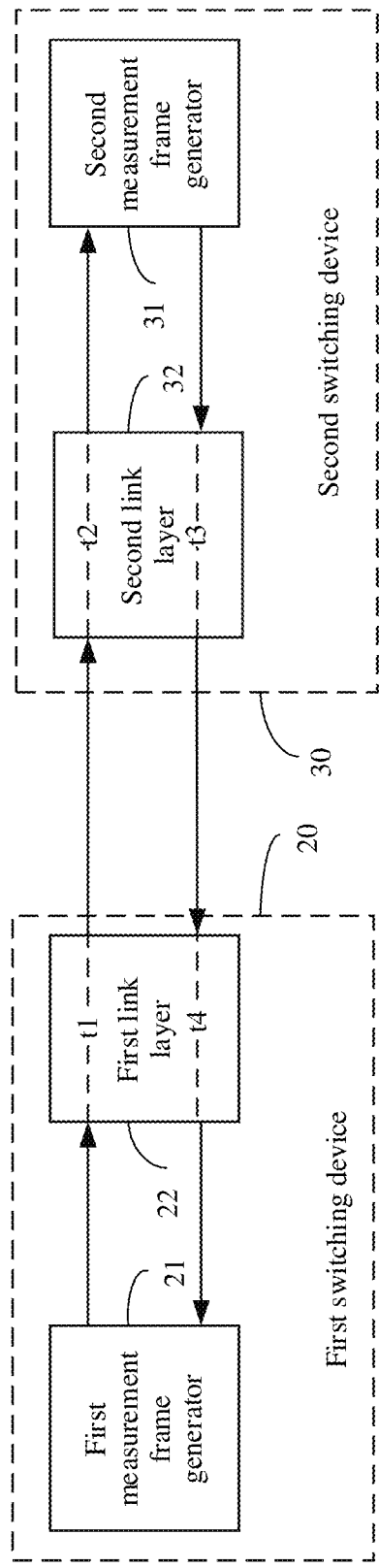
FIG. 2 is a schematic diagram 1 of a structure of communication between a first switching device and a second switching device according to an embodiment of the present disclosure.

FIG. 2 is a schematic diagram 1 of a structure of communication between a first switching device and a second switching device according to an embodiment of the present disclosure. As shown in FIG. 2, a first switching device 20 and a second switching device 30 are communicatively connected through a port. The first switching device 20 includes a first measurement frame generator 21 and a first link layer 22. The first measurement frame generator 21 may be any one of a processor, a field-programmable gate array (FPGA), and a PFC engine, and is used to generate a first measurement frame. The first link layer 22 is responsible for a MAC (media access control or medium access control) address of the first switching device 20. The second switching device 30 includes a second measurement frame generator 31 and a second link layer 32. The second measurement frame generator 31 may be any one of a processor, an FPGA, and a PFC engine, and is configured to perform loopback processing or acknowledgement processing on the received first measurement frame, to trigger a second measurement frame to be generated. The second link layer 32 is responsible for a MAC address of the second switching device 30. Optionally, the first measurement frame generator 21 of the first switching device 20 generates the first measurement frame. After receiving the first measurement frame, the second link layer 32 of the second switching device 30 forwards the first measurement frame to the second measurement frame generator 31. The second measurement frame generator 31 performs loopback processing or acknowledgement processing on the received first measurement frame to generate the second measurement frame, and sends the second measurement frame to the second link layer 32. The second link layer 32 sends the second measurement frame to the first switching device 20 based on the MAC address of the first switching device 20. A first timestamp t1, a second timestamp t2, a third timestamp t3, and a fourth timestamp t4 are encapsulated in the second measurement frame. The first timestamp t1 represents a time at which the first link layer 22 sends the first measurement frame to the second switching device 30, the second timestamp t2 represents a time at which the second link layer 32 receives the first measurement frame, the third timestamp t3 represents a time at which the second link layer 32 sends the second measurement frame, and the fourth timestamp t4 represents a time at which the first link layer 22 receives the second measurement frame.

For example, the first switching device 20 first calculates a first timestamp difference t based on the first timestamp t1, the second timestamp t2, the third timestamp t3, and the fourth timestamp t4, and then calculates a value of an HDRM by using the first timestamp difference, timestamp precision, a port rate between the first switching device and the second switching device, a configured maximum frame length, a PFC measurement frame length, and a constant K. A calculation formula is as follows:

$$HDRM = (t + 2 * \text{Timestamp precision}) * \text{SPEED} + 2 * \text{MAX FRAME} + \text{PFC MEASUREMENT FRAME} + K, \text{ where}$$

t=t4−t1−(t3−t2), Timestamp precision represents the timestamp precision, SPEED represents the port rate, MAX FRAME represents the configured maximum frame length, PFC MEASURE FRAME represents the PFC measurement frame length, and K is a constant. A value of K may be provided by a device manufacturer, and includes but is not limited to a receiving/transmission interface delay, a higher-layer delay, or the like defined in 802.1Qbb.

For example, the first switching device 20 sets an HDRM of a local buffer based on the calculated value of the HDRM. Optionally, the first switching device 20 may also send the calculated value of the HDRM to the second switching device 30, so that the second switching device 30 sets an HDRM of a local buffer based on the calculated value of the HDRM.

According to the structure of communication shown in FIG. 2, a value of an HDRM of a local buffer can be flexibly independently configured based on a data transmission requirement between switching devices in actual networking, so that the value of the HDRM of the switching device is neither excessively large nor excessively small. In this way, use of buffer space is reduced while no packet loss is ensured, so that the switching device can increase buffer space used by a user to absorb a burst, thereby supporting more lossless queues.

Figure 3:
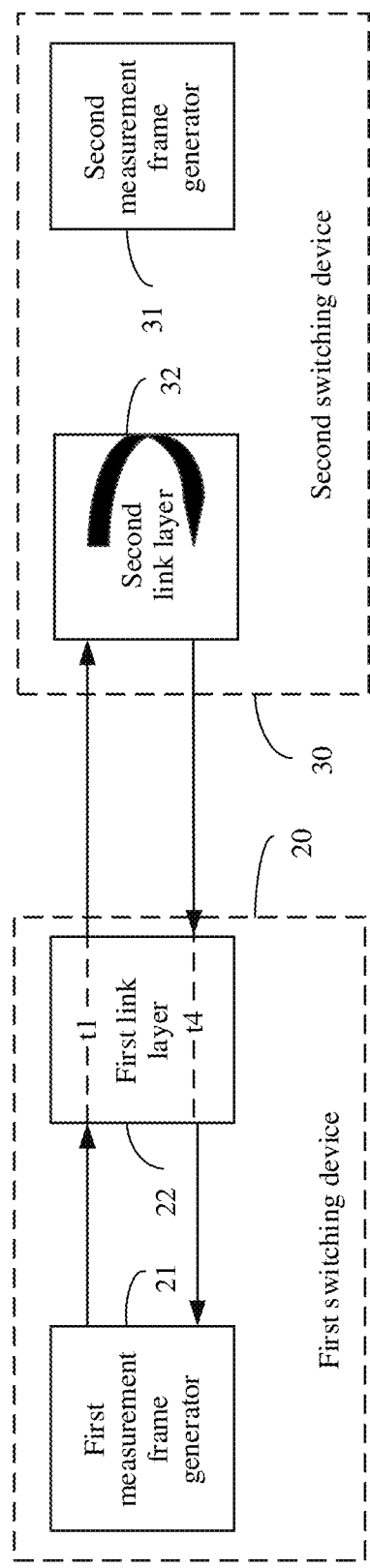
FIG. 3 is a schematic diagram 2 of a structure of communication between a first switching device and a second switching device according to an embodiment of the present disclosure.

FIG. 3 is a schematic diagram 2 of a structure of communication between a first switching device 20 and a second switching device 30 according to an embodiment of the present disclosure. As shown in FIG. 3, the first switching device 20 and the second switching device 30 are communicatively connected through a port. The first switching device 20 includes a first measurement frame generator 21 and a first link layer 22. The first measurement frame generator 21 may be any one of a processor, an FPGA, and a PFC engine, and is used to generate a first measurement frame. The first link layer 22 is responsible for a MAC address of the first switching device 20. The second switching device 30 includes a second measurement frame generator 31 and a second link layer 32. The second measurement frame generator 31 may be any one of a processor, an FPGA, and a PFC engine. The second link layer 32 is responsible for a MAC address of the second switching device 30. Optionally, the first measurement frame generator 21 of the first switching device 20 generates the first measurement frame. After receiving the first measurement frame, the second link layer 32 of the second switching device 30 directly performs loopback processing or acknowledgement processing on the received first measurement frame to trigger a second measurement frame to be generated, and sends the second measurement frame to the first switching device 20 based on the MAC address of the first switching device 20. A first timestamp t1 and a fourth timestamp t4 are encapsulated in the second measurement frame. The first timestamp t1 represents a time at which the first link layer 22 sends the first measurement frame to the second switching device 30, and the fourth timestamp t4 represents a time at which the first link layer 22 receives the second measurement frame.

For example, the first switching device 20 first calculates a second timestamp difference t' based on the first timestamp t1 and the fourth timestamp t4, and then calculates a value of an HDRM by using the second timestamp difference, timestamp precision, a port rate between the first switching device and the second switching device, a configured maximum frame length, a PFC measurement frame length, and a constant K. A calculation formula is as follows:

$$HDRM = (t' + 2*\text{Timestamp precision})*SPEED + 2*MAX\ FRAME + PFC\ MEASURE\ FRAME + K,$$

where t'=t4−t1, Timestamp precision represents the timestamp precision, SPEED represents the port rate, MAX FRAME represents the configured maximum frame length, PFC MEASURE FRAME represents the PFC measurement frame length, and K is a constant. A value of K may be provided by a device manufacturer, and includes but is not limited to a receiving/transmission interface delay, a higher-layer delay, or the like defined in 802.1Qbb.

For example, the first switching device 20 sets an HDRM of a local buffer based on the calculated value of the HDRM. Optionally, the first switching device 20 may also send the calculated value of the HDRM to the second switching device 30, so that the second switching device 30 sets an HDRM of a local buffer based on the calculated value of the HDRM.

According to the structure of communication shown in FIG. 3, a value of an HDRM of a local buffer can be flexibly independently configured based on a data transmission requirement between switching devices in actual networking, so that the value of the HDRM of the switching device is neither excessively large nor excessively small. In this way, use of buffer space is reduced while no packet loss is ensured, so that the switching device can increase buffer space used by a user to absorb a burst, thereby supporting more lossless queues.

The following describes the buffer configuration method in the present disclosure in detail by using specific embodiments. It should be noted that the following specific embodiments may be combined with each other, and same or similar content is not repeatedly described in different embodiments.

Figure 4:
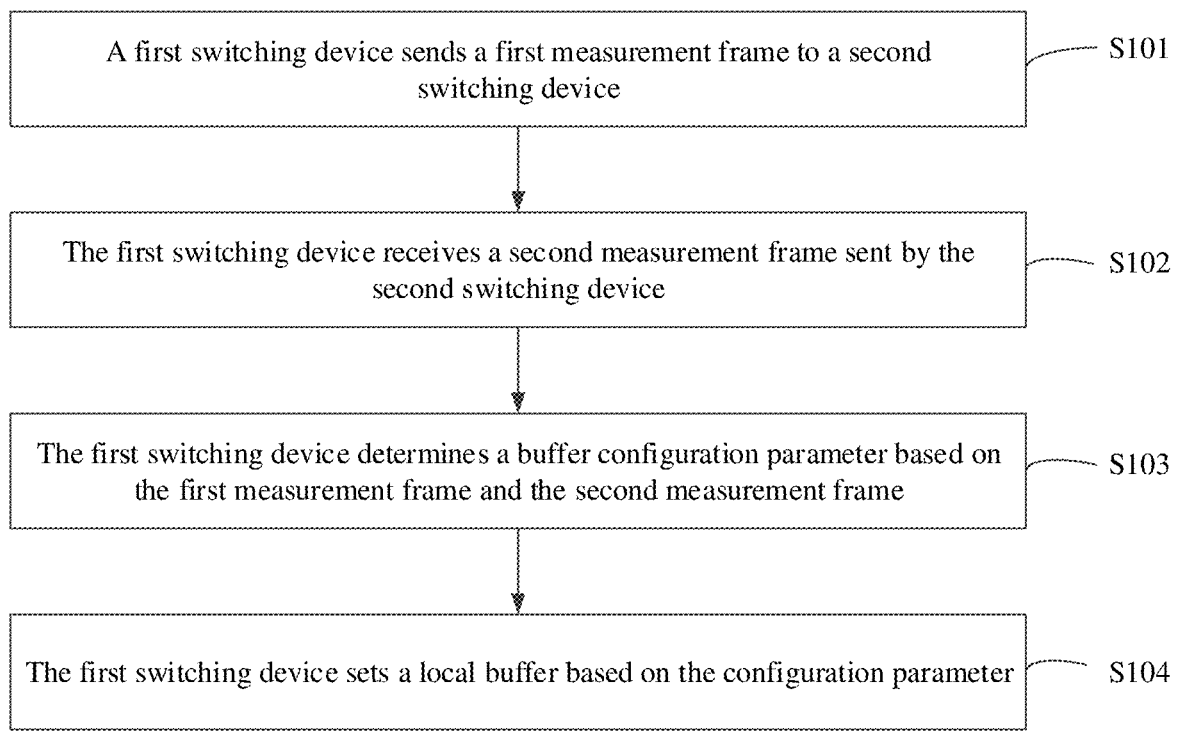
FIG. 4 is a flowchart 1 of a buffer configuration method according to an embodiment of the present disclosure.

FIG. 4 is a flowchart 1 of a buffer configuration method according to an embodiment of the present disclosure. Referring to FIG. 4, the method in this embodiment includes the following steps.

S101: A first switching device sends a first measurement frame to a second switching device.

For example, in S101, the first switching device and the second switching device are communicatively connected through a port. The first switching device and the second switching device may be network devices or terminal devices. A common network device includes a switch, and a common terminal device includes a network adapter. A first measurement frame generator is disposed inside the first switching device, and the first measurement frame generator may be any one of a processor, an FPGA, and a PFC engine. The first switching device sends the first measurement frame generated by the first measurement frame generator to the second switching device.

S102: The first switching device receives a second measurement frame sent by the second switching device.

For example, in S102, a second measurement frame generator is disposed inside the second switching device, and the second measurement frame generator may be any one of a processor, an FPGA, and a PFC engine. After the second switching device receives the first measurement frame sent by the first switching device, the second measurement frame generator triggers the second measurement frame to be generated, and sends the second measurement frame to the first switching device. Optionally, the second switching device does not process the first measurement frame sent by the first switching device, but directly performs feedback to the first switching device after performing loopback or acknowledgement on the received first measurement frame.

S103: The first switching device determines a buffer configuration parameter based on the first measurement frame and the second measurement frame.

For example, in S103, the first switching device may determine the buffer configuration parameter based on a time of sending the first measurement frame and a time of receiving the second measurement frame. Optionally, the time of sending the first measurement frame and the time of receiving the second measurement frame may be stored in a local buffer as timestamp information, and the buffer configuration parameter may be calculated by reading the timestamp information. Alternatively, the timestamp information may be directly encapsulated in the second measurement frame, and when a MAC layer of the first switching device obtains the second measurement frame, the timestamp information included in the second measurement frame is directly read to calculate the buffer configuration parameter.

For example, the first switching device obtains a first timestamp and a fourth timestamp, and the first timestamp and the fourth timestamp may represent a data exchange speed between the first switching device and the second switching device. Therefore, the first switching device can determine the buffer configuration parameter based on the first timestamp and the fourth timestamp, so that the configuration parameter fits data transmission performance of the first switching device and the second switching device. The first timestamp and the fourth timestamp are encapsulated in the second measurement frame, so that the first switching device can omit a timestamp reading step, thereby increasing the speed of obtaining timestamp information.

In an optional implementation, the first timestamp is a time at which the last bit of the first measurement frame enters the MAC layer of the first switching device, and the fourth timestamp is a time at which the last bit of the second measurement frame is sent from the MAC layer of the first switching device.

In another optional implementation, the first timestamp is a time at which the last bit of the first measurement frame is sent from the MAC layer of the first switching device, and the fourth timestamp is a time at which the last bit of the second measurement frame enters the MAC layer of the first switching device.

Figure 5:
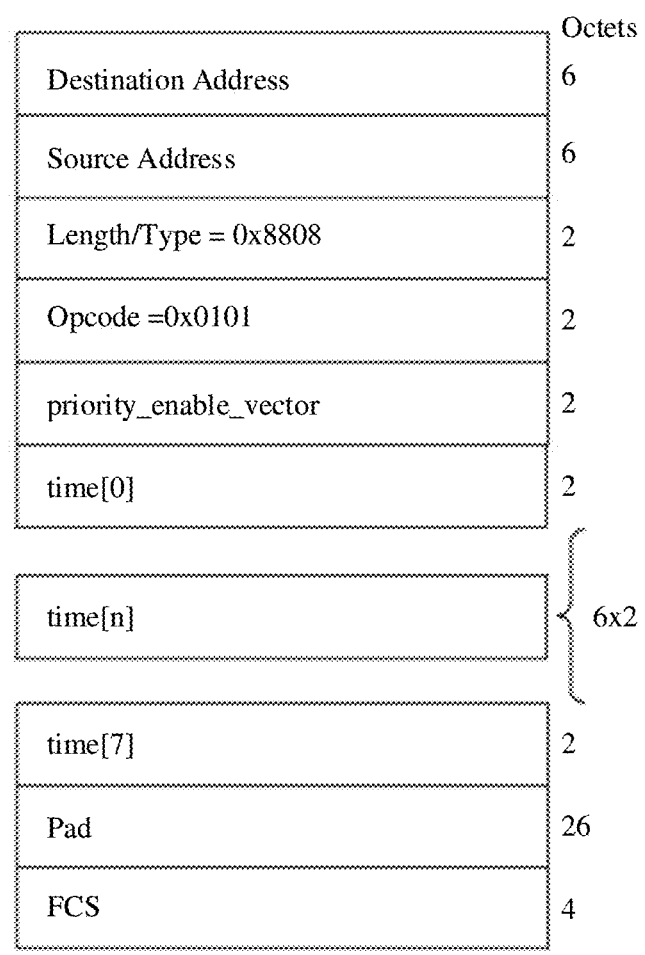
FIG. 5 is a schematic diagram of a structure of a PFC frame according to an embodiment of the present disclosure.

FIG. 5 is a schematic diagram of a structure of a PFC frame according to an embodiment of the present disclosure. As shown in FIG. 5, the PFC frame sequentially includes a destination address, a source address, a length/type (Length/Type=0x8808), an operation code (Opcode), a priority enable vector, time fields (time [0], time [n], and time [7]), pad, and a frame check sequence (FCS) from top to bottom. An octet represents a unit.

Because the PFC frame is a MAC control frame, the MAC layer of the first switching device can directly identify the Opcode field, and then read the time field following the Opcode field. For example, a value assigned to the Opcode field in the existing PFC frame may be modified to obtain a modified frame structure. The modified frame structure may be used as a frame structure of the second measurement frame. For example, in the modified frame structure, a length of 16 octets is set in the time field following the Opcode field to store a timestamp.

For example, the first timestamp and the fourth timestamp may be stored in the time field following the Opcode field of the second measurement frame.

For example, the first switching device calculates a timestamp difference based on the first timestamp and the fourth timestamp that are included in the second measurement frame, and then determines the buffer configuration parameter based on the timestamp difference, timestamp precision, a port rate between the first switching device and the second switching device, and a configured maximum frame length. Therefore, the first switching device can obtain the buffer configuration parameter associated with the exchange speed and the port rate between the first switching device and the second switching device and the configured maximum frame length, to implement an accurate configuration of the local buffer, thereby reducing use of the local buffer of the switching device, and improving a burst absorption capability and supporting more lossless queues while ensuring no packet loss.

In an optional implementation, the first switching device may further obtain a second timestamp and a third timestamp. The second timestamp is a time at which the second switching device receives the first measurement frame, and the third timestamp is a time at which the second switching device sends the second measurement frame. For example, the time at which the second switching device receives the first measurement frame is recorded as the second timestamp, and the time at which the second switching device sends the second measurement frame is recorded as the third timestamp. The second timestamp and the third timestamp may be used to represent delay time from receiving, by the second switching device, the first measurement frame to triggering the second measurement frame to be generated. Therefore, the first switching device can determine the buffer configuration parameter based on the first timestamp, the second timestamp, the third timestamp, and the fourth timestamp, so that the configuration parameter fits data transmission performance of the first switching device and the second switching device.

For example, the second timestamp is a time at which the last bit of the first measurement frame is sent from a MAC layer of the second switching device, and the third timestamp is a time at which the last bit of the second measurement frame enters the MAC layer of the second switching device.

For example, the second timestamp is a time at which the last bit of the first measurement frame enters a MAC layer of the second switching device, and the third timestamp is a time at which the last bit of the second measurement frame is sent from the MAC layer of the second switching device.

In an optional implementation, the second timestamp and the third timestamp are encapsulated in the time field following the Opcode field of the second measurement frame. For example, the second timestamp and the third timestamp may be encapsulated in the second measurement frame, so that a timestamp reading step can be omitted, and the first switching device can quickly obtain timestamp information. For example, a PFC frame format may be used as a format of the second measurement frame to store the second timestamp and the third timestamp in the time field following the Opcode field of the second measurement frame. Because the PFC frame is a MAC control frame, the MAC layer of the first switching device can directly identify the Opcode field, and then read the time field following the Opcode field to quickly obtain the timestamp information.

In an optional implementation, the second timestamp and the third timestamp may be alternatively stored in the local buffer of the first switching device. It should be noted that when the second timestamp and the third timestamp are stored in the local buffer of the first switching device, the first switching device needs to obtain timestamp information from the local buffer.

In an optional implementation, the first switching device determines a timestamp difference based on the first timestamp, the second timestamp, the third timestamp, and the fourth timestamp. The first switching device determines the buffer configuration parameter based on the timestamp difference, timestamp precision, a port rate between the first switching device and the second switching device, a configured maximum frame length, and a constant K. The constant K is provided by a device manufacturer. For example, the first switching device first calculates the timestamp difference based on the first timestamp, the second timestamp, the third timestamp, and the fourth timestamp, and then determines the buffer configuration parameter based on the timestamp difference, the timestamp precision, the port rate between the first switching device and the second switching device, and the configured maximum frame length. Therefore, the first switching device can obtain the buffer configuration parameter associated with the exchange speed and the port rate between the first switching device and the second switching device and the configured maximum frame length, to implement an accurate configuration of the local buffer, thereby reducing use of the local buffer of the switching device, and improving a burst absorption capability and supporting more lossless queues while ensuring no packet loss.

S104: The first switching device sets the local buffer based on the configuration parameter.

For example, in S104, the first switching device sets a size of the local buffer to the value calculated in S103.

For example, the buffer configuration parameter is used to represent a required buffer size, and a unit of the buffer configuration parameter includes a bit or a minimum storage unit of a chip buffer. The buffer configuration parameters include a buffer space required for priority-based flow control.

For example, referring to FIG. 2 and FIG. 3, when the configuration parameter is a value of an HDRM, the first switching device may calculate the timestamp difference T based on the first timestamp, the second timestamp, the third timestamp, and the fourth timestamp that are encapsulated in the second measurement frame, and then calculate the HDRM by using a formula. A specific calculation formula is as follows:

$$HDRM=(T+2*\text{Timestamp precision})*\text{SPEED}+2*\text{MAX FRAME}+\text{PFC MEASURE FRAME}+K,$$

where

T represents the timestamp difference, Timestamp precision represents the timestamp precision, SPEED represents the port rate, MAX FRAME represents the configured maximum frame length, PFC MEASURE FRAME represents a PFC measurement frame length, and K is a constant. A value of K may be provided by the device manufacturer, and includes but is not limited to a receiving/transmission interface delay, a higher-layer delay, or the like defined in 802.1Qbb.

In this embodiment, a timestamp difference of data frame transmission between the first switching device and the second switching device is obtained by constructing the first measurement frame and the second measurement frame and encapsulating a timestamp in the second measurement frame, and a buffer size required by the first switching device in a PFC mechanism is calculated based on the time difference, thereby implementing an automatic configuration of the local buffer on the side of the first switching device. More accurate calculation reduces use of the local buffer of the switching device, and can improve a burst absorption capability and support more lossless queues while ensuring no packet loss.

Figure 6:
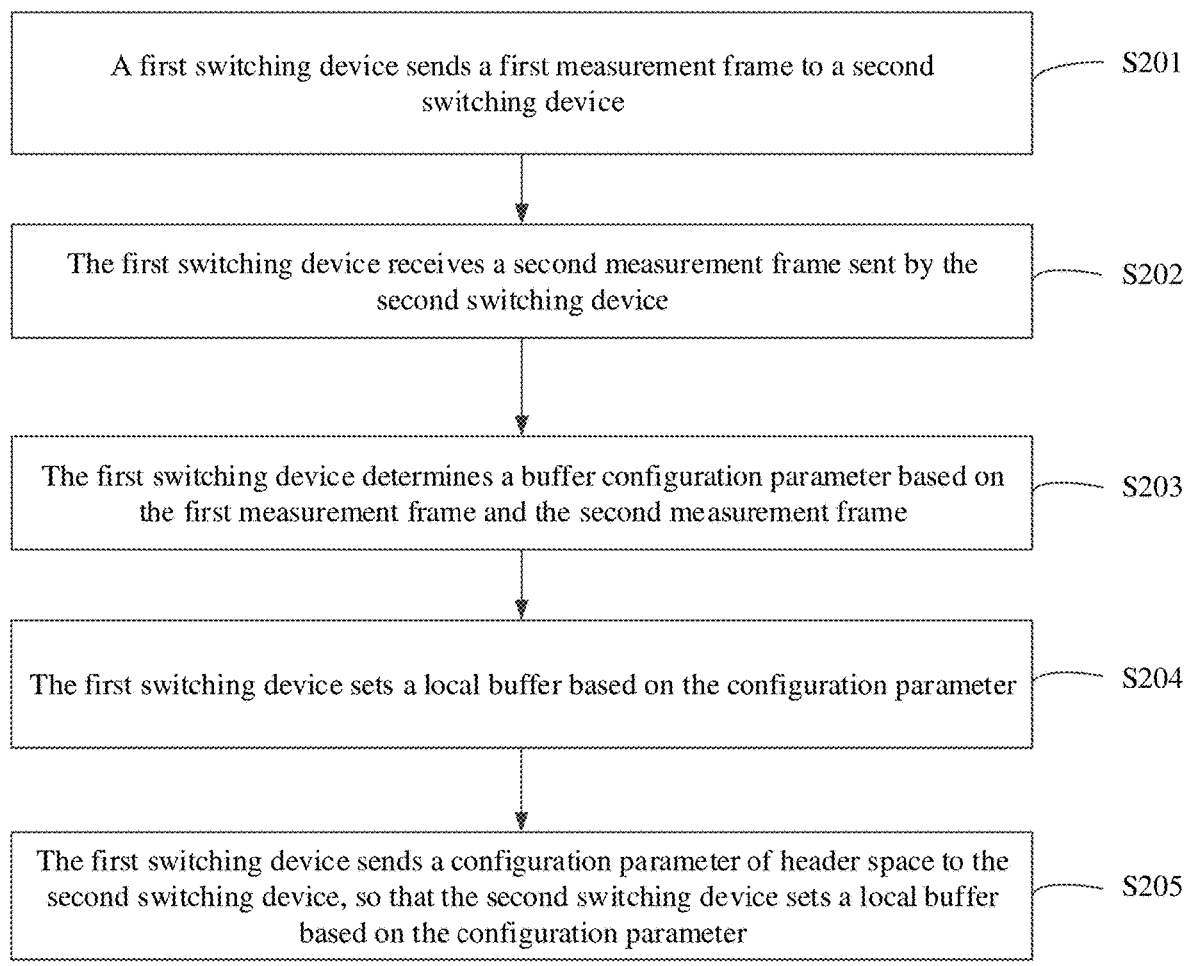
FIG. 6 is a flowchart 2 of a buffer configuration method according to an embodiment of the present disclosure.

FIG. 6 is a flowchart 2 of a buffer configuration method according to an embodiment of the present disclosure. Referring to FIG. 6, the method in this embodiment includes the following steps.

S201: A first switching device sends a first measurement frame to a second switching device.

S202: The first switching device receives a second measurement frame sent by the second switching device.

S203: The first switching device determines a buffer configuration parameter based on the first measurement frame and the second measurement frame.

S204: The first switching device sets a local buffer based on the configuration parameter.

For example, for a specific implementation process and implementation principle of S201 to S204 in this embodiment, refer to related descriptions of S101 to S104 in the method shown in FIG. 4. Details are not described herein again.

S205: The first switching device sends the buffer configuration parameter to the second switching device, so that the second switching device sets a local buffer based on the configuration parameter.

For example, in S205, after calculating the buffer configuration parameter in S203, the first switching device may further send the configuration parameter to the second switching device, so that the second switching device also sets the local buffer based on the calculated configuration parameter.

In this embodiment, a time difference of data frame transmission between the first switching device and the second switching device is obtained by constructing the first measurement frame and the second measurement frame and encapsulating a timestamp in the second measurement frame, and a buffer size required by the first switching device in a PFC mechanism is calculated based on the time difference, thereby implementing an automatic configuration of the local buffer on the side of the second switching device. More accurate calculation reduces use of the local buffer of the switching device, and can improve a burst absorption capability and support more lossless queues while ensuring no packet loss.

Figure 7:
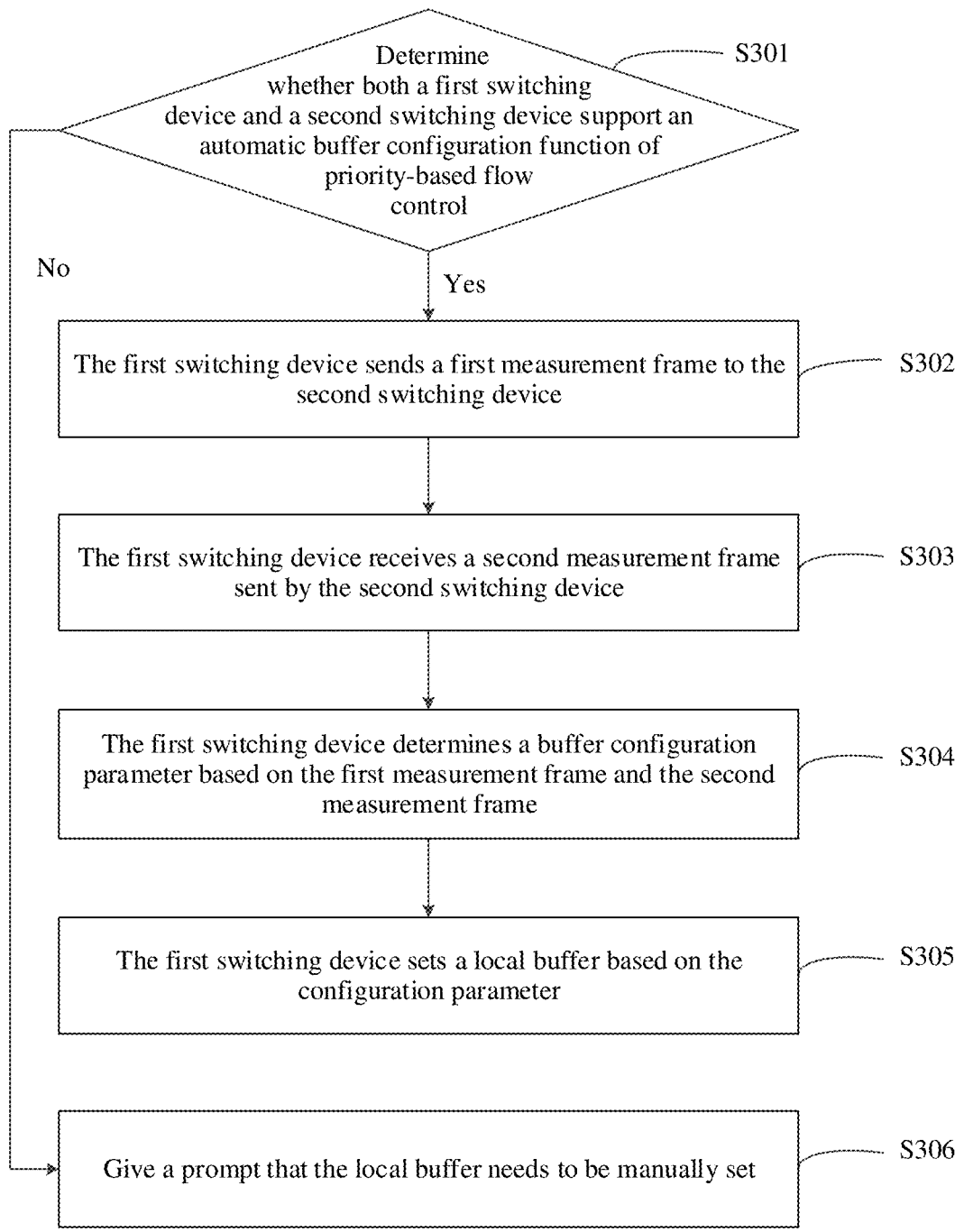
FIG. 7 is a flowchart 3 of a buffer configuration method according to an embodiment of the present disclosure.

FIG. 7 is a flowchart 3 of a buffer configuration method according to an embodiment of the present disclosure. Referring to FIG. 7, the method in this embodiment includes the following steps.

S301: Determine whether both a first switching device and a second switching device support an automatic buffer configuration function of priority-based flow control; and if yes, perform S302: or if no, perform S306.

For example, in S301, the first switching device sends TLV (the TLV is a variable format, and the TLV means a type, a length, and a value)-format data including a buffer configuration field to the second switching device. If TLV-format data that is received by the first switching device and that is fed back by the second switching device also includes the buffer configuration field, it is determined that both the first switching device and the second switching device support the automatic buffer configuration function of priority-based flow control.

For example, in S301, the first switching device receives the TLV-format data that is sent by the second switching device and that includes the buffer configuration field. If the TLV-format data that is fed back by the first switching device to the second switching device also includes the buffer configuration field, it is determined that both the first switching device and the second switching device support the automatic buffer configuration function of priority-based flow control.

S302: The first switching device sends a first measurement frame to the second switching device.

S303: The first switching device receives a second measurement frame sent by the second switching device.

S304: The first switching device determines a buffer configuration parameter based on the first measurement frame and the second measurement frame.

S305: The first switching device sets a local buffer based on the configuration parameter.

For example, for a specific implementation process and implementation principle of S302 to S305 in this embodiment, refer to related descriptions of S101 to S104 in the method shown in FIG. 4. Details are not described herein again.

S306: Give a prompt that needs to be manually set.

Figure 8:
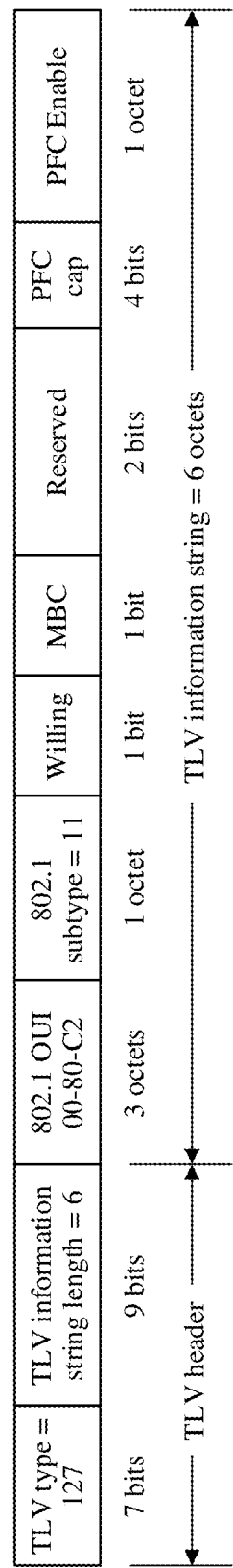
FIG. 8 is a schematic diagram of an architecture of existing IEEE DCBX PFC TLV.
Figure 9:
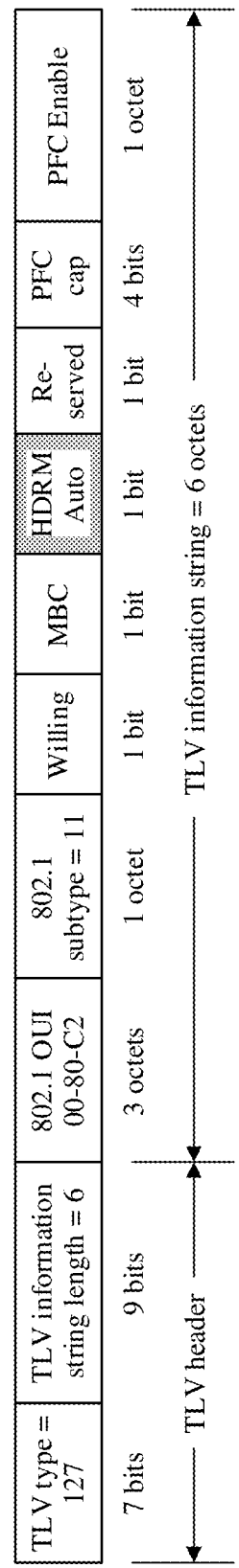
FIG. 9 is a schematic diagram of an architecture of extended and updated IEEE DCBX PFC TLV.

For example, in this embodiment, the first switching device and the second switching device first notify, by using an LLDP (link layer discovery protocol), whether each other has an automatic configuration function of a PFC HDRM. Optionally, this may be implemented by extending PFC configuration TLV. FIG. 8 is a schematic diagram of an architecture of existing IEEE DCBX PFC TLV, and FIG. 9 is a schematic diagram of an architecture of extended and updated IEEE DCBX PFC TLV. 1 bit is removed from a reserved field of the existing IEEE DCBX PFC TLV in FIG. 8 to store an HDRM, to obtain the extended and updated IEEE DCBX PFC TLV shown in FIG. 9. As shown in FIG. 8, fields are sequentially a TLV type, a TLV information string length, an 802.1 organizationally unique identifier, an 802.1 subtype, willing, a MACsec bypass capability, the reserved field, a PFC capability, and PFC enable from left to right. As shown in FIG. 9, fields are sequentially a TLV type, a TLV information string length, an 802.1 organizationally unique identifier, an 802.1 subtype, willing, a MACsec bypass capability, supporting automatic HDRM measurement, a reserved field, a PFC capability, and PFC enable from left to right.

Figure 10:
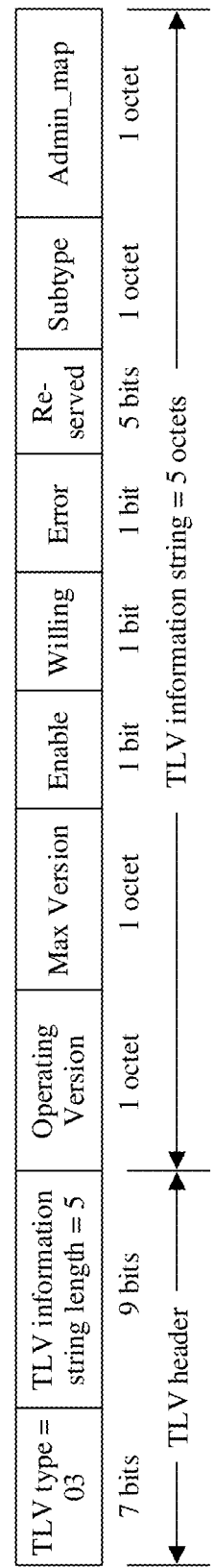
FIG. 10 is a schematic diagram of an architecture of existing first-version Intel DCBX PFC TLV.
Figure 11:
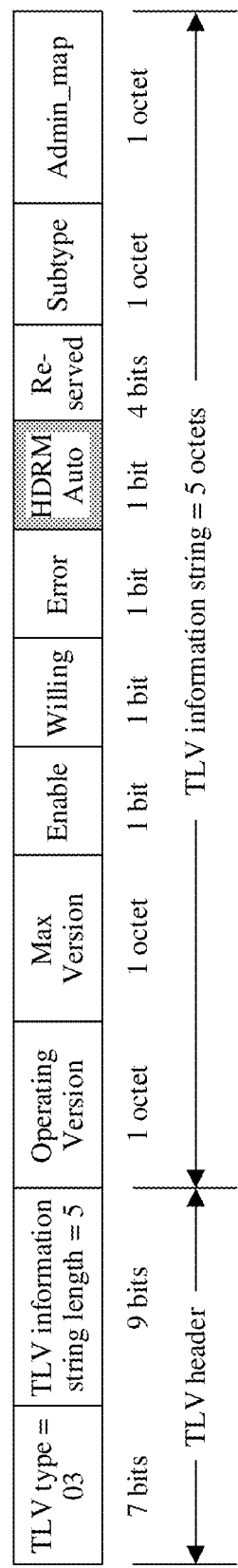
FIG. 11 is a schematic diagram of an architecture of extended and updated first-version Intel DCBX PFC TLV.

For example, FIG. 10 is a schematic diagram of an architecture of existing first-version Intel DCBX PFC TLV, and FIG. 11 is a schematic diagram of an architecture of extended and updated first-version Intel DCBX PFC TLV. 1 bit is removed from a reserved field of the existing first-version Intel DCBX PFC TLV in FIG. 10 to store an HDRM, to obtain the extended and updated first-version Intel DCBX PFC TLV shown in FIG. 11. As shown in FIG. 10, fields are sequentially a TLV type, a TLV information string length, an operating version, a maximum version, enable, willing, an error, the reserved field, a subtype, and a bit mapping in an administration mode from left to right. As shown in FIG. 11, fields are sequentially a TLV type, a TLV information string length, an operating version, a maximum version, enable, willing, an error, supporting automatic HDRM measurement, a reserved field, a subtype, and a bit mapping in an administration mode from left to right.

Figure 12:
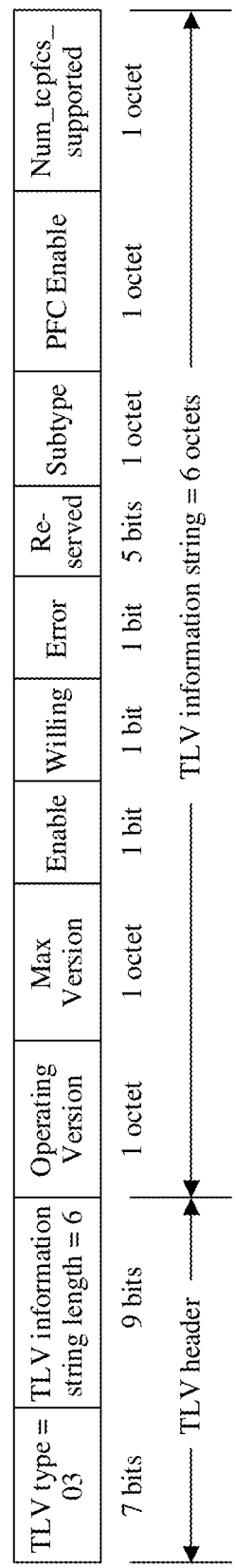
FIG. 12 is a schematic diagram of an architecture of existing second-version Intel DCBX PFC TLV.
Figure 13:
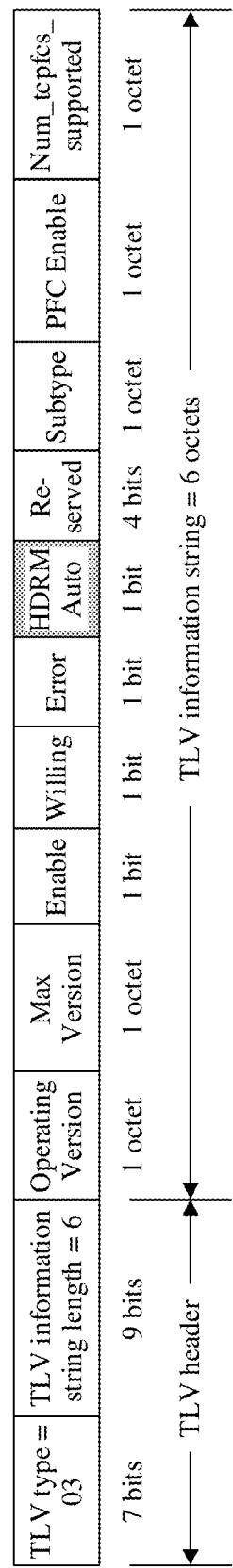
FIG. 13 is a schematic diagram of an architecture of extended and updated second-version Intel DCBX PFC TLV.

For example, FIG. 12 is a schematic diagram of an architecture of existing second-version Intel DCBX PFC TLV, and FIG. 13 is a schematic diagram of an architecture of extended and updated second-version Intel DCBX PFC TLV. 1 bit is removed from a reserved field of the existing second-version Intel DCBX PFC TLV in FIG. 12 to store an HDRM, to obtain the extended and updated second-version Intel DCBX PFC TLV shown in FIG. 13. As shown in FIG. 12, fields are sequentially a TLV type, a TLV information string length, an operating version, a maximum version, enable, willing, an error, the reserved field, a subtype, a PFC enable priority, and a maximum number of supported traffic classes from left to right. As shown in FIG. 13, fields are sequentially a TLV type, a TLV information string length, an operating version, a maximum version, enable, willing, an error, supporting automatic HDRM measurement, a reserved field, a subtype, a PFC enable priority, and a maximum number of supported traffic classes from left to right.

A time difference of data frame transmission between the first switching device and the second switching device is obtained by constructing a PFC HDRM measurement frame and encapsulating a timestamp in the second measurement frame, and a size of an HDRM is calculated based on the time difference, thereby implementing an automatic HDRM configuration on the side of the first switching device and the side of the second switching device. More accurate calculation reduces use of the local buffer of the switching device, and can improve a burst absorption capability and support more lossless queues while ensuring no packet loss.

Figure 14:
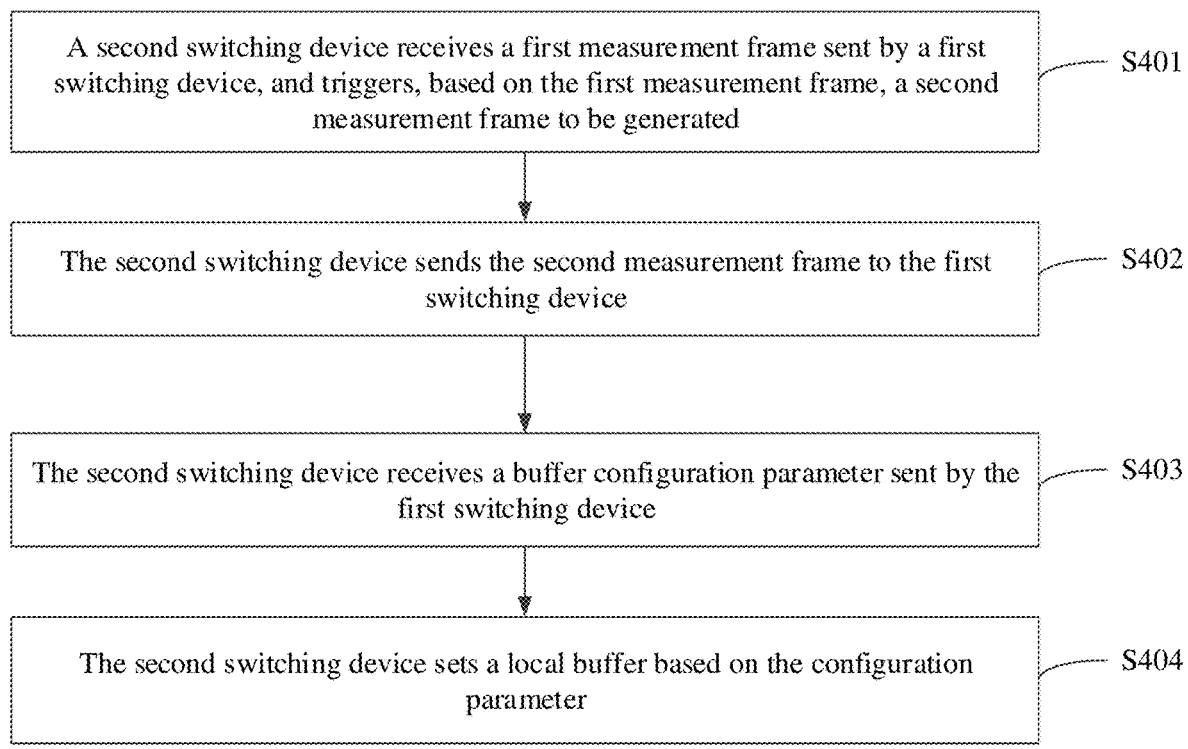
FIG. 14 is a flowchart 4 of a buffer configuration method according to an embodiment of the present disclosure.

FIG. 14 is a flowchart 4 of a buffer configuration method according to an embodiment of the present disclosure. Referring to FIG. 14, the method in this embodiment includes the following steps.

S401: A second switching device receives a first measurement frame sent by a first switching device, and triggers, based on the first measurement frame, a second measurement frame to be generated.

For example, in S401, the first switching device and the second switching device are communicatively connected through a port. The first switching device and the second switching device may be network devices or terminal devices. A common network device includes a switch, and a common terminal device includes a network adapter. A first measurement frame generator is disposed inside the first switching device, and the first measurement frame generator may be any one of a processor, an FPGA, and a PFC engine. The second switching device receives the first measurement frame sent by the first switching device. The first measurement frame is generated by the first measurement frame generator of the first switching device.

For example, a second measurement frame generator is disposed inside the second switching device, and the second measurement frame generator may be any one of a processor, an FPGA, and a PFC engine. After receiving the first measurement frame sent by the first switching device, the second switching device sends the second measurement frame generated by the second measurement frame generator to the first switching device. Optionally, the second switching device does not process the first measurement frame sent by the first switching device, but directly performs feedback to the first switching device after performing loopback or acknowledgement on the received first measurement frame.

S402: The second switching device sends the second measurement frame to the first switching device.

For example, in S402, the second switching device sends the second measurement frame to the first switching device based on a MAC address of the first switching device.

S403: The second switching device receives a buffer configuration parameter sent by the first switching device.

For example, in S403, after calculating the buffer configuration parameter, the first switching device may further send the configuration parameter to the second switching device.

S404: The second switching device sets a local buffer based on the configuration parameter.

For example, in S404, the second switching device sets the local buffer based on the configuration parameter calculated by the first switching device. A time difference of data frame transmission between the first switching device and the second switching device is obtained by constructing the first measurement frame and the second measurement frame and encapsulating a timestamp in the second measurement frame, and a size of an HDRM is calculated based on the time difference, thereby implementing an automatic HDRM configuration on the side of the second switching device. More accurate calculation reduces use of the local buffer of the switching device, and can improve a burst absorption capability and support more lossless queues while ensuring no packet loss.

Figure 15:
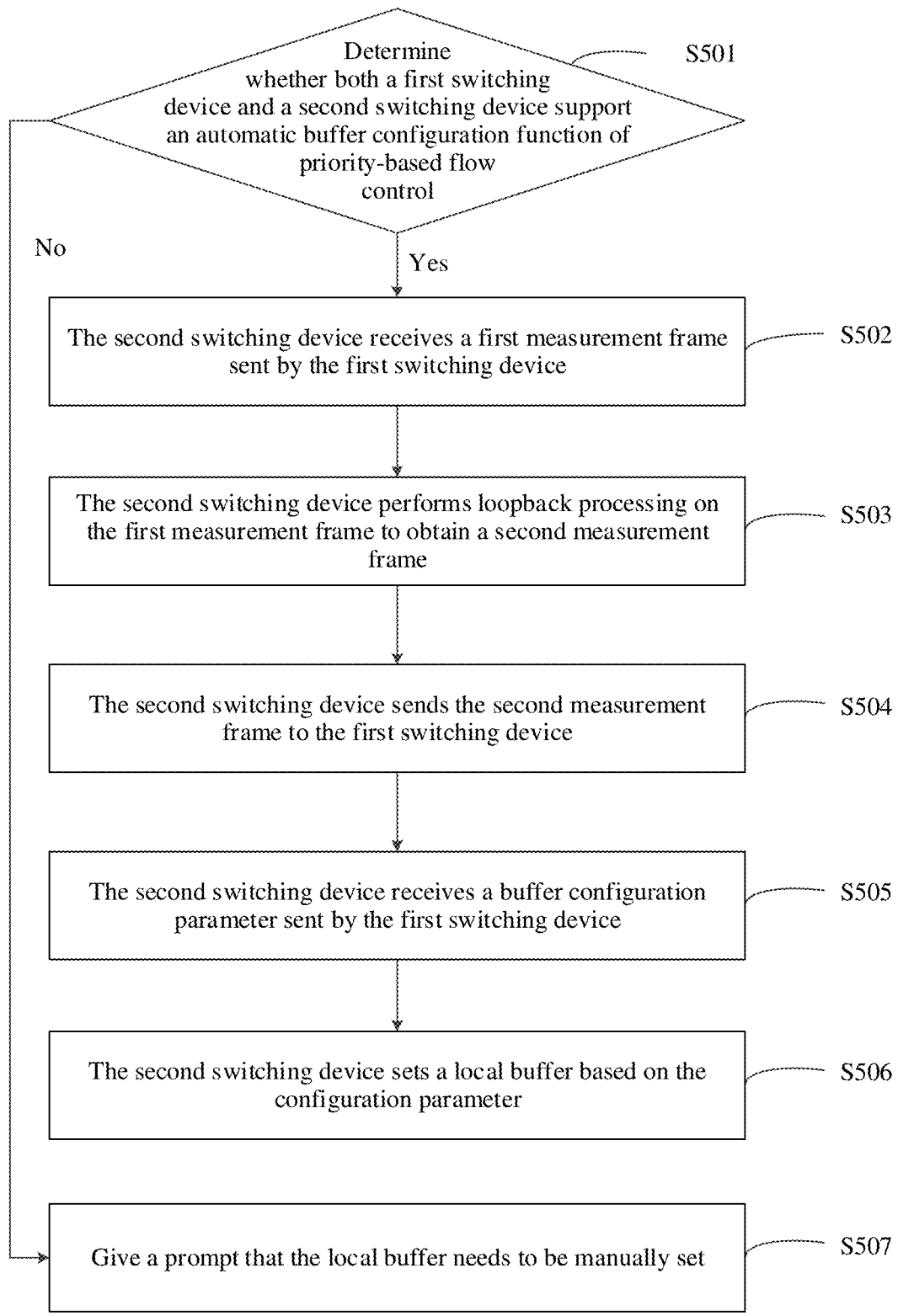
FIG. 15 is a flowchart 5 of a buffer configuration method according to an embodiment of the present disclosure.

FIG. 15 is a flowchart 5 of a buffer configuration method according to an embodiment of the present disclosure. Referring to FIG. 15, the method in this embodiment includes the following steps.

S501: Determine whether both a first switching device and a second switching device support an automatic buffer configuration function of priority-based flow control; and if yes, perform S502: or if no, perform S507.

For example, in S501, the second switching device receives TLV-format data that is sent by the first switching device and that includes a buffer configuration field. If TLV-format data that is fed back by the second switching device to the first switching device also includes the buffer configuration field, it is determined that both the first switching device and the second switching device support the automatic buffer configuration function of priority-based flow control.

For example, in S501, the second switching device sends the TLV-format data including the buffer configuration field to the first switching device. If the TLV-format data that is received by the second switching device and that is fed back by the first switching device also includes the buffer configuration field, it is determined that both the first switching device and the second switching device support the automatic buffer configuration function of priority-based flow control.

S502: The second switching device receives a first measurement frame sent by the first switching device.

S503: The second switching device performs loopback processing on the first measurement frame to obtain a second measurement frame.

S504: The second switching device sends the second measurement frame to the first switching device.

S505: The second switching device receives a buffer configuration parameter sent by the first switching device.

S506: The second switching device sets a local buffer based on the configuration parameter.

For example, for a specific implementation process and implementation principle of S502 to S506 in this embodiment, refer to related descriptions of S401 to S405 in the method shown in FIG. 14. Details are not described herein again.

S507: Give a prompt that needs to be manually set.

In this embodiment, a time difference of data frame transmission between the first switching device and the second switching device is obtained by constructing the first measurement frame and the second measurement frame and encapsulating a timestamp in the second measurement frame, and a buffer size required by the first switching device in a PFC mechanism is calculated based on the time difference, thereby implementing an automatic configuration of local buffers on the side of the first switching device and the side of the second switching device. More accurate calculation reduces use of the local buffer of the switching device, and can improve a burst absorption capability and support more lossless queues while ensuring no packet loss.

Figure 16:
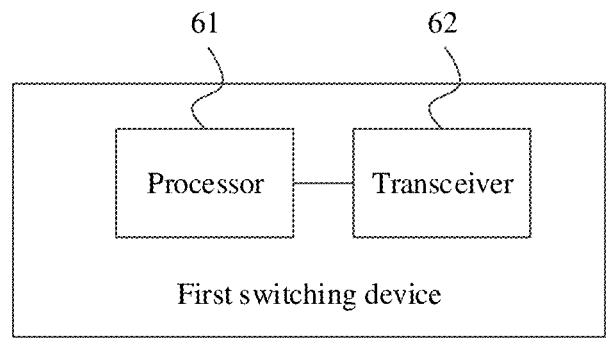
FIG. 16 is a schematic diagram 1 of a structure of a first switching device according to an embodiment of the present disclosure.

FIG. 16 is a schematic diagram 1 of a structure of a first switching device according to an embodiment of the present disclosure. Referring to FIG. 16, the first switching device in this embodiment includes a processor 61 and a transceiver 62.

The transceiver 62 is configured to send a first measurement frame to a second switching device.

The transceiver 62 is configured to receive a second measurement frame sent by the second switching device. The second measurement frame is generated through triggering based on the first measurement frame.

The processor 61 is configured to determine a buffer configuration parameter based on the first measurement frame and the second measurement frame.

The processor 61 is configured to set a local buffer based on the configuration parameter.

In this possible design, the first switching device may be applied to a networking architecture including the first switching device and the second switching device, and the first switching device and the second switching device are communicatively connected through a port. The first switching device and the second switching device may be network devices or terminal devices. A common network device includes a switch, and a common terminal device includes a network adapter. A first measurement frame generator is disposed inside the first switching device, and the first measurement frame generator may be any one of a processor, an FPGA, and a PFC engine. The first switching device sends the first measurement frame to the second switching device. After receiving the first measurement frame, the second switching device triggers the second measurement frame to be generated. The first switching device determines the configuration parameter of the local buffer based on the first measurement frame and the second measurement frame, to implement an automatic configuration of the local buffer, thereby reducing use of the local buffer of the switching device, and improving a burst absorption capability and supporting more lossless queues while ensuring no packet loss.

In a possible design, the processor 61 is specifically configured to:

obtain a first timestamp and a fourth timestamp, where the first timestamp is a time at which the first switching device sends the first measurement frame, and the fourth timestamp is a time at which the first switching device receives the second measurement frame; and determine the buffer configuration parameter based on the first timestamp and the fourth timestamp.

In this possible design, the time at which the first switching device sends the first measurement frame is recorded as the first timestamp, and the time at which the first switching device receives the second measurement frame is recorded as the fourth timestamp. The first timestamp and the fourth timestamp may be used to represent a data exchange speed between the first switching device and the second switching device. Therefore, the first switching device can determine the buffer configuration parameter based on the first timestamp and the fourth timestamp, so that the configuration parameter fits data transmission performance of the first switching device and the second switching device.

In a possible design, the first timestamp is a time at which the last bit of the first measurement frame enters a MAC layer of the first switching device, and the fourth timestamp is a time at which the last bit of the second measurement frame is sent from the MAC layer of the first switching device.

In a possible design of the first aspect, the first timestamp is a time at which the last bit of the first measurement frame is sent from a MAC layer of the first switching device, and the fourth timestamp is a time at which the last bit of the second measurement frame enters the MAC layer of the first switching device.

In a possible design of the first aspect, the first timestamp and the fourth timestamp are encapsulated in a time field following an Opcode field of the second measurement frame.

In this possible design, the first timestamp and the fourth timestamp may be encapsulated in the second measurement frame, so that a timestamp reading step can be omitted, and the first switching device can quickly obtain timestamp information. For example, a PFC frame format may be used as a format of the second measurement frame to store the first timestamp and the fourth timestamp in the time field following the Opcode field of the second measurement frame. Because a PFC frame is a MAC control frame, the MAC layer of the first switching device can directly identify the Opcode field, and then read the time field following the Opcode field to quickly obtain the timestamp information.

In a possible design of the first aspect, the first timestamp and the fourth timestamp are stored in the local buffer of the first switching device.

In this possible design, the first timestamp and the fourth timestamp are stored in the local buffer of the first switching device, and the first switching device obtains timestamp information from the local buffer.

In a possible design, the processor 61 is specifically configured to:

determine a timestamp difference based on the first timestamp and the fourth timestamp; and determine the buffer configuration parameter based on the timestamp difference, timestamp precision, a port rate between the first switching device and the second switching device, a configured maximum frame length, and a constant K provided by a device manufacturer.

In this possible design, the first switching device first calculates the timestamp difference based on the first timestamp and the fourth timestamp, and then determines the buffer configuration parameter based on the timestamp difference, the timestamp precision, the port rate between the first switching device and the second switching device, and the configured maximum frame length. Therefore, the first switching device can obtain the buffer configuration parameter associated with the exchange speed and the port rate between the first switching device and the second switching device and the configured maximum frame length, to implement an accurate configuration of the local buffer, thereby reducing use of the local buffer of the switching device, and improving a burst absorption capability and supporting more lossless queues while ensuring no packet loss.

In a possible design, the processor 61 is further configured to:

obtain a second timestamp and a third timestamp, where the second timestamp is a time at which the second switching device receives the first measurement frame, and the third timestamp is a time at which the second switching device sends the second measurement frame.

In this possible design, the time at which the second switching device receives the first measurement frame is recorded as the second timestamp, and the time at which the second switching device sends the second measurement frame is recorded as the third timestamp. The second timestamp and the third timestamp may be used to represent delay time from receiving, by the second switching device, the first measurement frame to triggering the second measurement frame to be generated. Therefore, the first switching device can determine the buffer configuration parameter based on the first timestamp, the second timestamp, the third timestamp, and the fourth timestamp, so that the configuration parameter fits data transmission performance of the first switching device and the second switching device.

In a possible design of the first aspect, the second timestamp is a time at which the last bit of the first measurement frame is sent from a MAC layer of the second switching device, and the third timestamp is a time at which the last bit of the second measurement frame enters the MAC layer of the second switching device.

In a possible design of the first aspect, the second timestamp is a time at which the last bit of the first measurement frame enters a MAC layer of the second switching device, and the third timestamp is a time at which the last bit of the second measurement frame is sent from the MAC layer of the second switching device.

In a possible design of the first aspect, the second timestamp and the third timestamp are encapsulated in the time field following the Opcode field of the second measurement frame.

In this possible design, the second timestamp and the third timestamp may be encapsulated in the second measurement frame, so that a timestamp reading step can be omitted, and the first switching device can quickly obtain timestamp information. For example, the PFC frame format may be used as the format of the second measurement frame to store the second timestamp and the third timestamp in the time field following the Opcode field of the second measurement frame. Because the PFC frame is a MAC control frame, the MAC layer of the first switching device can directly identify the Opcode field, and then read the time field following the Opcode field to quickly obtain the timestamp information.

In a possible design of the first aspect, the second timestamp and the third timestamp are stored in the local buffer of the first switching device.

In this possible design, the second timestamp and the third timestamp are stored in the local buffer of the first switching device, and the first switching device obtains timestamp information from the local buffer.

In a possible design, the processor 61 is specifically configured to:

determine a timestamp difference based on the first timestamp, the second timestamp, the third timestamp, and the fourth timestamp; and determine the buffer configuration parameter based on the timestamp difference, timestamp precision, a port rate between the first switching device and the second switching device, a configured maximum frame length, and a constant K provided by a device manufacturer.

In this possible design, the first switching device first calculates the timestamp difference based on the first timestamp, the second timestamp, the third timestamp, and the fourth timestamp, and then determines the buffer configuration parameter based on the timestamp difference, the timestamp precision, the port rate between the first switching device and the second switching device, and the configured maximum frame length. Therefore, the first switching device can obtain the buffer configuration parameter associated with the exchange speed and the port rate between the first switching device and the second switching device and the configured maximum frame length, to implement an accurate configuration of the local buffer, thereby reducing use of the local buffer of the switching device, and improving a burst absorption capability and supporting more lossless queues while ensuring no packet loss.

In a possible design, the processor 61 is specifically configured to:

send the buffer configuration parameter to the second switching device, so that the second switching device sets a local buffer based on the configuration parameter.

In this possible design, the second switching device may further set the local buffer of the second switching device by using the buffer configuration parameter calculated by the first switching device, so that the second switching device can also implement an automatic configuration of the buffer.

In a possible design, the processor 61 is further configured to:

determine whether both the first switching device and the second switching device support an automatic buffer configuration function of priority-based flow control.

In this possible design, only when both the first switching device and the second switching device support the automatic buffer configuration function of priority-based flow control, the foregoing method can be applied to implement an automatic configuration of the local buffer. Therefore, before the method is applied, it is first determined whether both the first switching device and the second switching device support the automatic buffer configuration function of priority-based flow control.

In a possible design, the determining whether both the first switching device and the second switching device support an automatic buffer configuration function of priority-based flow control includes:

when the first switching device supports the automatic buffer configuration function of priority-based flow control, and received TLV-format data fed back by the second switching device includes a buffer configuration field, determining that both the first switching device and the second switching device support the automatic buffer configuration function of priority-based flow control.

In this possible design, a link layer discovery protocol (LLDP) may be used between the first switching device and the second switching device to determine whether both the first switching device and the second switching device support the automatic buffer configuration function of priority-based flow control.

In a possible design, the automatic buffer configuration function is not supported by either the first or second switching device, the processor 61 is further configured to: give a prompt that the local buffer needs to be manually set.

In a possible design, the buffer configuration parameter is used to represent a required buffer size, and a unit of the buffer configuration parameter includes a bit or a minimum storage unit of a chip buffer.

In a possible design, the buffer configuration parameter includes buffer space required for priority-based flow control.

In a possible design, the second measurement frame is generated by the second switching device by performing loopback or acknowledgement processing on the first measurement frame.

In this embodiment, a time difference of data frame transmission between the first switching device and the second switching device is obtained by constructing the first measurement frame and the second measurement frame and encapsulating a timestamp in the second measurement frame, and a buffer size required by the first switching device in a PFC mechanism is calculated based on the time difference, thereby implementing an automatic configuration of local buffers on the side of the first switching device and the side of the second switching device. More accurate calculation reduces use of the local buffer of the switching device, and can improve a burst absorption capability and support more lossless queues while ensuring no packet loss.

Figure 17:
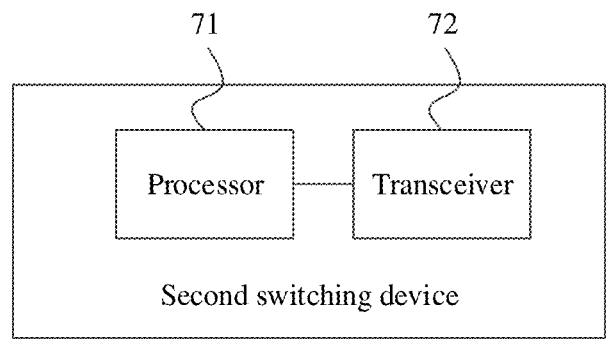
FIG. 17 is a schematic diagram 1 of a structure of a second switching device according to an embodiment of the present disclosure.

FIG. 17 is a schematic diagram 1 of a structure of a second switching device according to an embodiment of the present disclosure. Referring to FIG. 17, the second switching device in this embodiment includes a processor 71 and a transceiver 72.

The transceiver 72 is configured to: receive a first measurement frame sent by a first switching device, and trigger, based on the first measurement frame, a second measurement frame to be generated.

The transceiver 72 is configured to send the second measurement frame to the first switching device.

The transceiver 72 is configured to receive a buffer configuration parameter sent by the first switching device.

The processor 71 is configured to set a local buffer based on the configuration parameter.

In this possible design, the second switching device may be applied to a networking architecture including the first switching device and the second switching device, and the first switching device and the second switching device are communicatively connected through a port. The first switching device and the second switching device may be network devices or terminal devices. A common network device includes a switch, and a common terminal device includes a network adapter. A second measurement frame generator is disposed inside the second switching device, and the second measurement frame generator may be any one of a processor, an FPGA, and a PFC engine. After receiving the first measurement frame sent by the first switching device, the second switching device triggers the second measurement frame to be generated, and sends the second measurement frame to the first switching device, so that the first switching device determines the configuration parameter of the local buffer based on the first measurement frame and the second measurement frame. Finally, the second switching device configures the local buffer based on the buffer configuration parameter determined by the first switching device, to implement an automatic configuration of the local buffer, thereby reducing use of the local buffer of the switching device, and improving an absorption burst capability and supporting more lossless queues while ensuring no packet loss.

In a possible design, the processor 71 is further configured to:

determine whether both the first switching device and the second switching device support an automatic buffer configuration function of priority-based flow control.

In this possible design, only when both the first switching device and the second switching device support the automatic buffer configuration function of priority-based flow control, the foregoing method can be applied to implement an automatic configuration of the local buffer. Therefore, before the method is applied, it is first determined whether both the first switching device and the second switching device support the automatic buffer configuration function of priority-based flow control.

In a possible design, the processor 71 is specifically configured to:

when the second switching device supports the automatic buffer configuration function of priority-based flow control, and received TLV-format data fed back by the first switching device includes a buffer configuration field, determining that both the first switching device and the second switching device support the automatic buffer configuration function of priority-based flow control.

In this possible design, a link layer discovery protocol (LLDP) may be used between the first switching device and the second switching device to determine whether both the first switching device and the second switching device support the automatic buffer configuration function of priority-based flow control.

In a possible design, the processor 71 is further configured to:

give a prompt that the local buffer needs to be manually set.

In a possible design, the buffer configuration parameter is used to represent a required buffer size, and a unit of the buffer configuration parameter includes a bit or a minimum storage unit of a chip buffer.

In a possible design, the buffer configuration parameter includes buffer space required for priority-based flow control.

In a possible design, the triggering, based on the first measurement frame, a second measurement frame to be generated includes:

The second switching device performs loopback or acknowledgement processing on the first measurement frame to generate the second measurement frame.

In this embodiment, a time difference of data frame transmission between the first switching device and the second switching device is obtained by constructing the first measurement frame and the second measurement frame and encapsulating a timestamp in the second measurement frame, and a buffer size required by the first switching device in a PFC mechanism is calculated based on the time difference, thereby implementing an automatic configuration of local buffers on the side of the first switching device and the side of the second switching device. More accurate calculation reduces use of the local buffer of the switching device, and can improve a burst absorption capability and support more lossless queues while ensuring no packet loss.

Figure 18:
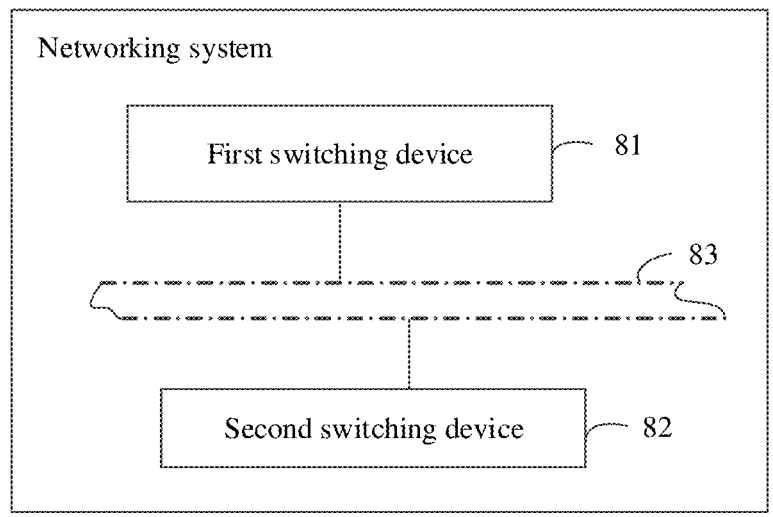
FIG. 18 is a schematic diagram of a structure of a networking system according to an embodiment of the present disclosure.

FIG. 18 is a schematic diagram of a structure of a networking system according to an embodiment of the present disclosure. Referring to FIG. 18, the networking system in this embodiment includes a first switching device 81 and a second switching device 82, and the first switching device 81 and the second switching device 82 are communicatively connected through a communication port 83.

For example, the first switching device 81 performs the methods shown in FIG. 4, FIG. 6, and FIG. 7, and the second switching device performs the methods shown in FIG. 14 and FIG. 15. For a specific implementation process and implementation principle of the first switching device and the second switching device, refer to related descriptions in the embodiments shown in FIG. 3 to FIG. 7, FIG. 14, and FIG. 15. Details are not described herein again.

An embodiment of the present disclosure provides a computer-readable storage medium. The computer-readable storage medium stores instructions, and when the instructions are executed, a computer performs the method performed by the terminal device in the foregoing embodiment of the present disclosure.

An embodiment of the present disclosure provides a computer-readable storage medium. The computer-readable storage medium stores instructions, and when the instructions are executed, a computer performs the method performed by the network device in the foregoing embodiment of the present disclosure.

In the several embodiments provided in the present disclosure, it should be understood that the disclosed apparatuses and methods may be implemented in other manners. For example, the foregoing apparatus embodiments are merely examples. For example, division into the units is merely logical function division, and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, in other words, may be located in one position, or may be distributed on a plurality of network units. Some or all of the units may be selected based on actual requirements to achieve the objectives of the solutions of embodiments.

In addition, functional units in embodiments of the present disclosure may be integrated into one processing unit, each of the units may exist alone physically, or two or more units may be integrated into one unit. The integrated unit may be implemented in a form of hardware, or may be implemented in a form of hardware in addition to a software functional unit.

It should be noted that, in embodiments of the present disclosure, division into the modules is an example and is merely logical function division, and may be other division during actual implementation. Functional modules in embodiments of the present disclosure may be integrated into one processing module, or each of the modules may exist alone physically, or two or more modules are integrated into one module. The integrated module may be implemented in a form of hardware, or may be implemented in a form of a software functional module.

When the integrated module is implemented in the form of a software functional module and sold or used as an independent product, the integrated module may be stored in a computer-readable storage medium. Based on such an understanding, the technical solutions of the present disclosure essentially, or the part contributing to the conventional technology, or all or a part of the technical solutions may be implemented in a form of a computer software product. The computer software product is stored in a storage medium and includes several instructions for instructing a computer device (which may be a personal computer, a server, or a network device) or a processor to perform all or a part of the steps of the methods in embodiments of the present disclosure. The foregoing storage medium includes any medium that can store program code, such as a USB flash drive, a removable hard disk, a read-only memory (ROM), a random access memory (RAM), a magnetic disk, or an optical disc.

All or some of the foregoing embodiments may be implemented by using software, hardware, firmware, or any combination thereof. When software is used to implement the embodiments, all or a part of the embodiments may be implemented in a form of a computer program product. The computer program product includes one or more computer instructions. When the computer instructions are loaded and executed on a computer, all or some of the procedures or functions according to embodiments of the present disclosure are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state disk (SSD)), or the like.

What is claimed is:
1. A buffer configuration method, comprising:
sending, by a first switching device, a first measurement frame to a second switching device;
receiving, by the first switching device, a second measurement frame sent by the second switching device, wherein the second measurement frame is generated based on the first measurement frame and the generation of the second measurement frame is triggered after receiving the first measurement frame;
determining, by the first switching device, a buffer configuration parameter based on the first measurement frame and the second measurement frame; and
setting, by the first switching device, a local buffer based on the buffer configuration parameter, wherein the determining, by the first switching device, a buffer configuration parameter based on the first measurement frame and the second measurement frame comprises:
  obtaining, by the first switching device, a first timestamp and a fourth timestamp, wherein the first timestamp is a time at which the first switching device sends the first measurement frame, and the fourth timestamp is a time at which the first switching device receives the second measurement frame; and
  determining, by the first switching device, the buffer configuration parameter based on the first timestamp and the fourth timestamp.

2. The method according to claim 1, wherein the first timestamp is a time at which the last bit of the first measurement frame enters a media access control (MAC) layer of the first switching device, and the fourth timestamp is a time at which the last bit of the second measurement frame is sent from the MAC layer of the first switching device.

3. The method according to claim 1, wherein the first timestamp is a time at which the last bit of the first measurement frame is sent from a MAC layer of the first switching device, and the fourth timestamp is a time at which the last bit of the second measurement frame enters the MAC layer of the first switching device.

4. The method according to claim 1, wherein the first timestamp and the fourth timestamp are encapsulated in a time field following an Opcode field of the second measurement frame.

5. The method according to claim 1, wherein the first timestamp and the fourth timestamp are stored in the local buffer of the first switching device.

6. The method according to claim 1, wherein the determining the buffer configuration parameter based on the first timestamp and the fourth timestamp comprises:
  determining, by the first switching device, a timestamp difference based on the first timestamp and the fourth timestamp; and
  determining, by the first switching device, the buffer configuration parameter based on the timestamp difference, timestamp precision, a port rate between the first switching device and the second switching device, a configured maximum frame length, and a constant K provided by a device manufacturer.

7. The method according to claim 1, further comprising:
  obtaining, by the first switching device, a second timestamp and a third timestamp, wherein the second timestamp is a time at which the second switching device receives the first measurement frame, and the third timestamp is a time at which the second switching device sends the second measurement frame to the first switching device.

8. The method according to claim 7, wherein the second timestamp is a time at which the last bit of the first measurement frame is sent from a MAC layer of the second switching device, and the third timestamp is a time at which the last bit of the second measurement frame enters the MAC layer of the second switching device.

9. The method according to claim 7, the second timestamp is a time at which the last bit of the first measurement frame enters a MAC layer of the second switching device, and the third timestamp is a time at which the last bit of the second measurement frame is sent from the MAC layer of the second switching device.

10. The method according to claim 1, wherein the buffer configuration parameter comprises a value of a priority-based flow control (PFC) headroom.

11. A buffer configuration method, comprising:
  receiving, by a second switching device, a first measurement frame sent by a first switching device, and generating, by the second switching device and based on the first measurement frame, a second measurement frame after receiving the first measurement frame;
  sending, by the second switching device, the second measurement frame to the first switching device;
  receiving, by the second switching device, a buffer configuration parameter sent by the first switching device; and
  setting, by the second switching device, a local buffer based on the buffer configuration parameter,
  wherein the generating, by the second switching device and based on the first measurement frame, a second measurement frame comprises:
  performing, by the second switching device, loopback or acknowledgement processing on the first measurement frame to generate the second measurement frame.

12. The method according to claim 11, wherein before the receiving, by a second switching device, a first measurement frame sent by a first switching device, the method further comprises:
  determining whether both the first switching device and the second switching device support an automatic buffer configuration function for priority-based flow control.

13. The method according to claim 12, wherein the determining whether both the first switching device and the second switching device support an automatic buffer configuration function for priority-based flow control comprises:
  when the second switching device supports the automatic buffer configuration function for priority-based flow control, and received TLV-format data fed back by the first switching device comprises a buffer configuration field, determining that both the first switching device and the second switching device support the automatic buffer configuration function for priority-based flow control.

14. The method according to claim 13, wherein the automatic buffer configuration function is not supported by either the first or second switching device, the method further comprises:
  outputting a prompt that the local buffer needs to be manually set.

15. The method according to claim 11, wherein the buffer configuration parameter represents a required buffer size, and a unit of the buffer configuration parameter comprises a bit or a minimum storage unit of a chip buffer.

16. The method according to claim 11, wherein the buffer configuration parameter comprises a buffer space required for priority-based flow control.

17. A first switching device, comprising at least one processor and a transceiver, wherein the at least one processor is configured to execute instructions in computer-executable program code; and when the at least one processor executes the instructions, the first switching device is enabled to perform operations comprising:
  sending a first measurement frame to a second switching device;
  receiving a second measurement frame sent by the second switching device, wherein the second measurement frame is generated based on the first measurement frame and the generation of the second measurement frame is triggered after receiving the first measurement frame;

determining a buffer configuration parameter based on the first measurement frame and the second measurement frame; and setting a local buffer based on the buffer configuration parameter, wherein the determining a buffer configuration parameter based on the first measurement frame and the second measurement frame comprises:

obtaining a first timestamp and a fourth timestamp, wherein the first timestamp is a time at which the first switching device sends the first measurement frame, and the fourth timestamp is a time at which the first switching device receives the second measurement frame; and determining the buffer configuration parameter based on the first timestamp and the fourth timestamp.

18. The first switching device according to claim 17, wherein the buffer configuration parameter comprises a value of a priority-based flow control (PFC) headroom.

19. A second switching device, comprising at least one processor and a transceiver, wherein the at least one processor is configured to execute instructions in computer-executable program code; and when the at least one processor executes the instructions, the second switching device is enabled to perform operations comprising:

receiving a first measurement frame sent by a first switching device, and generating, based on the first measurement frame, a second measurement frame, wherein the generation of the second measurement frame is triggered after receiving the first measurement frame;

sending the second measurement frame to the first switching device;

receiving a buffer configuration parameter sent by the first switching device; and setting a local buffer based on the buffer configuration parameter, wherein the generating, based on the first measurement frame, a second measurement frame comprises:

performing loopback or acknowledgement processing on the first measurement frame to generate the second measurement frame.

* * * * *